US011989505B2

(12) United States Patent
Khanna et al.

(10) Patent No.: US 11,989,505 B2
(45) Date of Patent: May 21, 2024

(54) GENERATING PERSONALIZED DIGITAL DESIGN TEMPLATE RECOMMENDATIONS

(71) Applicant: Adobe Inc., San Jose, CA (US)

(72) Inventors: Anand Khanna, San Jose, CA (US); Oliver Brdiczka, San Jose, CA (US); Alexandru Vasile Costin, Monte Sereno, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/938,253

(22) Filed: Oct. 5, 2022

(65) Prior Publication Data
US 2024/0119230 A1    Apr. 11, 2024

(51) Int. Cl.
G06F 40/186    (2020.01)
G06F 40/30    (2020.01)
G06N 3/08    (2023.01)

(52) U.S. Cl.
CPC ............ G06F 40/186 (2020.01); G06F 40/30 (2020.01); G06N 3/08 (2013.01)

(58) Field of Classification Search
CPC .......... G06F 40/186; G06F 40/30; G06N 3/08
USPC ........................................................ 715/253
See application file for complete search history.

(56) References Cited

U.S. PATENT DOCUMENTS

| 6,026,417 A * | 2/2000 | Ross ..................... G06F 40/166 707/999.005 |
| 10,402,064 B1 * | 9/2019 | Al-Sallami .......... G06Q 20/322 |
| 10,629,186 B1 * | 4/2020 | Slifka ................. G10L 15/1815 |
| 11,733,649 B2 * | 8/2023 | Seo ........................ G06T 17/205 345/426 |
| 2011/0261994 A1 * | 10/2011 | Cok ...................... G06F 40/186 382/100 |
| 2016/0007065 A1 * | 1/2016 | Peles ................ H04N 21/23439 725/34 |
| 2016/0349936 A1 * | 12/2016 | Cho ..................... G06F 3/04886 |
| 2017/0344656 A1 * | 11/2017 | Koren .................. G06Q 10/101 |
| 2018/0121881 A1 * | 5/2018 | Kumar ................ G06F 3/04845 |
| 2019/0026280 A1 * | 1/2019 | Aviyam ................ G06F 16/958 |
| 2019/0034976 A1 * | 1/2019 | Hamedi ............. G06Q 30/0243 |
| 2020/0159995 A1 * | 5/2020 | Mukherjee ............. G06N 20/00 |
| 2020/0394699 A1 * | 12/2020 | Mueller ............. G06Q 30/0185 |
| 2021/0103930 A1 * | 4/2021 | Fu ....................... G06Q 20/4016 |
| 2021/0133249 A1 * | 5/2021 | Parhi ..................... G06F 16/353 |
| 2021/0200943 A1 * | 7/2021 | Aviyam ................ G06F 16/953 |
| 2021/0224319 A1 * | 7/2021 | Ingel ..................... G06F 16/686 |
| 2021/0342785 A1 * | 11/2021 | Mann .................. G06F 11/3409 |
| 2022/0215606 A1 * | 7/2022 | Radford ............... G06F 40/103 |

* cited by examiner

Primary Examiner — Andrew R Dyer
(74) Attorney, Agent, or Firm — Keller Preece PLLC

(57) ABSTRACT

The present disclosure relates to systems, methods, and non-transitory computer-readable media that provides to a user a subset of digital design templates as recommendations based on a creative segment classification and template classifications. For instance, in one or more embodiments, the disclosed systems generate the creative segment classification for the user and determines geo-seasonal intent data. Furthermore, the disclosed system generates template classifications using a machine learning model based on geo-seasonality and creative intent. In doing so, the disclosed system identifies a subset of digital design templates based on the template classifications, geo-seasonal intent data, and the creative segment classification of the user.

20 Claims, 12 Drawing Sheets

GENERATING PERSONALIZED DIGITAL DESIGN TEMPLATE RECOMMENDATIONS

BACKGROUND

Recent years have seen significant advancement in hardware and software platforms for enabling client devices to create and/or manipulate digital content. For example, many platforms offer software applications that provide pre-created designs/templates for users to modify. Some of these platforms further implement systems for recommending, to a client device, particular digital designs within a software application for the client device to make further modifications or additions to a provided digital design.

SUMMARY

One or more embodiments described herein provide benefits and/or solve one or more of problems in the art with systems, methods, and non-transitory computer-readable media that generate digital design template recommendations based on creative segment classifications and template classifications generated utilizing machine learning. For instance, in one or more embodiments, a system generates, utilizing one or more machine learning models, a creative segment classification and determines geo-seasonal data relevant to a user. The system generates template classifications based on geo-seasonality and creative intent to identify a relevant set of digital design templates to provide as recommendations. In particular, the disclosed system draws from a plurality of digital design templates and identifies a subset of digital design templates using the generated creative segment classification and template classifications. Moreover, in one or more embodiments, the disclosed system utilizes individually or in combination the creative segment classification, geo-seasonal intent data, template classifications, and user signals to provide tailored digital design template recommendations for a user.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
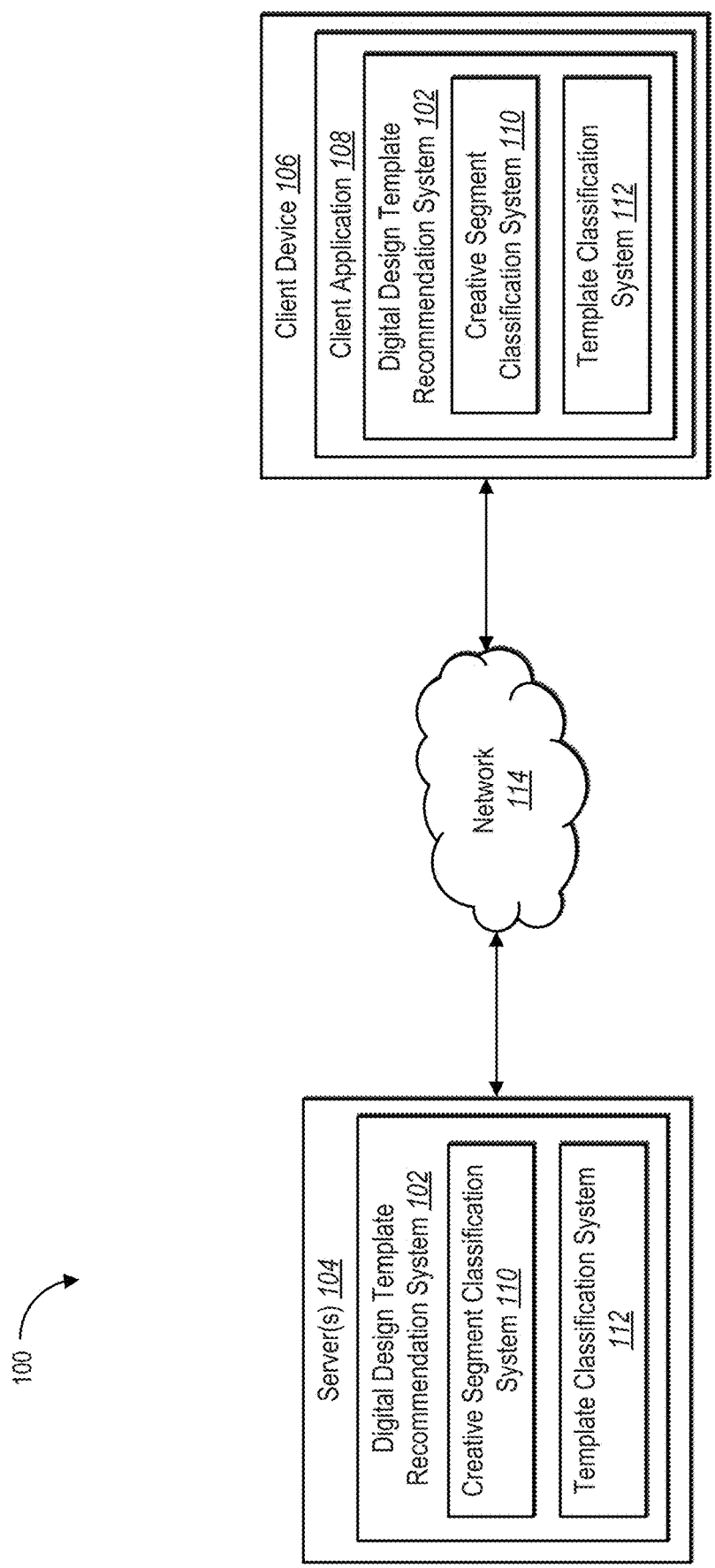
FIG. 1 illustrates an example environment in which digital design template recommendation system operates in accordance with one or more embodiments.

One or more embodiments described herein include a digital design template recommendation system that utilizes a machine learning model to generate tailored and personalized recommendations for a user. To illustrate, in some embodiments, the digital design template recommendation system utilizes geo-seasonal intent data, creative intent, and user classifiers to identify a subset of digital design templates to recommend to the user. Furthermore, in one or more embodiments, over time, as the digital design template recommendation system gathers more information, the digital design template recommendation system blends the geo-seasonal intent data, creative intent, creative segment classifiers, historical analytics, and real-time data of the user to identify relevant digital design templates that are tailored and personalized to match the creative purposes of the user.

As just mentioned above, the digital design template recommendation system generates a creative segment classification for a user. Indeed, in some embodiments, the digital design template recommendation system assigns the creative segment classification based on how a user responds to a creative segment classification survey. For instance, the digital design template recommendation system provides a survey to classify the user at the graphical user interface. In some instances, however, the digital design template recommendation system provides a creative segment classification survey to the user, but the digital design template recommendation system receives no response. For example, the user elects to skip the survey and continue using the client application. In this situation, the digital design template recommendation system determines the creative segment classification of the user based on a machine learning model that processes that data such as previews, clicks, and exports. In particular, the capability of the digital design template recommendation system to identify a creative segment classification of the user regardless of whether the user responds to a survey allows for the system to tailor digital design template recommendations even for new users that are starting "cold."

As also mentioned above, the digital design template recommendation system determines geo-seasonal intent data. To do so, the digital design template recommendation system counts the number of exports by unique users for each geographic locale in a determined period (e.g., one week). In one or more implementations, the digital design template recommendation system identifies and segregates seasonal templates from non-seasonal templates. In particular, the digital design template recommendation system generates a length vector that spans a year for each digital design template that includes export counts per geographic locale. Utilizing a min-max scalar, the digital design template recommendation system determines whether a given digital design template is seasonal when the normalized value is less than or equal to a predetermined threshold.

As further mentioned above, the digital design template recommendation system generates template classifications. For example, the digital design template recommendation system utilizes a machine learning model to determine the classification of a template. In particular, the digital design template recommendation system determines sets of curated collection for creative segment classifications, user responses to surveys, prior exports, and creative intent. To illustrate, the digital design template recommendation system utilizes via the machine learning model the aforementioned elements to generate template classifications.

In addition to the above, the digital design template recommendation system ranks new digital design templates received at the digital design template recommendation system. For example, the digital design template recommendation system detects a new digital design template and in response identifies a subset of digital design templates from seasonal templates for a geographic locale within a given time period. In particular, the digital design template recommendation system determines for each template of the above-mentioned subset of templates a creative intent. To illustrate, the digital design template recommendation system ranks each of the templates within the subset utilizing a creative intent ranker and determines a ranking for the new digital design template based on overlapping intents of the new digital design template with each digital design template of the subset of digital design templates.

Moreover, as mentioned above, the digital design template recommendation system provides personalization digital design template recommendations. For example, for "cold-start" users (users where the disclosed system has little to no information), the digital design template recommendation system still has available geo-seasonal intent data, template classifications and user classifiers. In particular, over time, the digital design template recommendation system becomes increasingly more personalized based on gathered historical analytics and real-time data. To illustrate, the digital design template recommendation system blends geo-seasonal data, template classifications, user classifiers, and any other user data to provide tailored and personalized digital design template recommendations.

The digital design template recommendation system provides several advantages over conventional systems. For example, conventional systems suffer from several technological shortcomings that result in inefficient and inflexible operation. Conventional recommendation systems often fail to operate efficiently. For example, because conventional systems tend to provide static recommendations that are irrelevant to a user of the client device, such systems typically require a significant amount of user interactions with the client device to access those application features that are relevant. Often, conventional systems upon "cold-start" provide generic global based recommendations. As such, users of conventional systems are required to scroll or navigate through numerous templates before finding one that matches their creative purposes. In particular, efficiency concerns on mobile devices for these conventional recommendation systems are exacerbated, due to the smaller screen size and hundreds of thousands of templates typically available.

In addition to the efficiency concerns mentioned above, conventional systems also suffer from inflexibility concerns. While conventional systems make recommendations, these recommendations typically do not recommend content that represents the actual creative intent and creative segment of a user in the realm of creative purposes such as digital design templates. Thus, because conventional recommendation systems fail to recommend content that is representative of creative intent of a user, the user often receives irrelevant and out-of-date content. Accordingly, conventional systems are inflexible in updating and matching the creative purposes of users working with digital design templates.

For example, the digital design template recommendation system operates more efficiently than conventional systems. For example, by providing digital design template recommendations that are relevant to a user due to the creative segment classification, geo-seasonal intent data, creative intent, and template classifications, the digital design template recommendation system reduces the user interactions typically required by conventional systems to access relevant digital design templates. The digital design template recommendation system provides to new users a subset of digital design template as recommendations. Indeed, because of this, in many instances, the digital design template recommendation system eliminates interactive steps needed to navigate through numerous menus, sub-menus, and/or windows to access a desired digital design template. Accordingly, the geo-seasonal intent data utilized by the digital design template recommendation system results in lower production constraints and the filtering of digital design templates based on creative intent/geo-seasonal intent data provide more relevant and efficient data to the users.

In addition, the digital design template recommendation system operates with improved flexibility when compared to conventional systems. In particular, by dynamically updating the recommendations that are presented, the digital design template recommendation system flexibly improves upon the static recommendations provided under conventional systems. Moreover, by further personalizing recommendations using the in-application behavior of a user, the digital design template recommendation system flexibly recommends digital design templates that are relevant to the user based on the user's creative purposes and the geo-seasonal intent data. Thus, over time the digital design template recommendation system further improves the relevancy of the recommendations by using a personalization machine learning model that is tuned to the preferences of the user and the personalization is blended with geo-seasonal intent data. Moreover, the event based-probability recommendations generated by the digital design template recommendation system further enhances the flexibility of the digital design template recommendation system.

Additional detail regarding the feature recommendation system will now be provided with reference to the figures. For example, FIG. 1 illustrates a schematic diagram of an exemplary system 100 in which digital design template recommendation system 102 operates. As illustrated in FIG. 1, the system 100 includes a server(s) 104, a network 114, and client device 106. Although the system 100 of FIG. 1 is depicted as having a particular number of components, the system 100 is capable of having any number of additional or alternative components (e.g., any number of servers, client devices, or other components in communication with the digital design template recommendation system 102 via the network 114). Similarly, although FIG. 1 illustrates a particular arrangement of the server(s) 104, the network 114, and the client device 106, various additional arrangements are possible.

The server(s) 104, the network 114, and the client device 106 are communicatively coupled with each other either directly or indirectly (e.g., through the network 114 discussed in greater detail below in relation to FIG. 9). Moreover, the server(s) 104 and the client device 106 include one or more of a variety of computing devices (including one or more computing devices as discussed in greater detail with relation to FIG. 9).

As mentioned above, the system 100 includes the server(s) 104. In one or more embodiments, the server(s) 104 generates, stores, receives, and/or transmits data including models, digital content, and recommendations for application features. In one or more embodiments, the server(s) 104 comprises a data server. In some implementations, the server(s) 104 comprises a communication server or a web-hosting server.

In one or more embodiments, the client device 106 includes computing devices that access, edit, segment, modify, store, and/or provide, for display, digital content such as digital design templates. For example, the client device 106 include smartphones, tablets, desktop computers, laptop computers, head-mounted-display devices, or other electronic devices. The client device 106 includes one or more applications (e.g., the client application 108) that access, edit, segment, modify, store, and/or provide, for display, digital content such as digital design templates. For example, in one or more embodiments, the client application 108 includes a software application installed on the client device 106. Additionally, or alternatively, the client application 108 includes a software application hosted on the server(s) 104 which are accessible by the client device 106 through another application, such as a web browser.

To provide an example implementation, in some embodiments, the digital design template recommendation system 102 on the server(s) 104 supports the digital design template recommendation system 102 on the client device 106. For instance, in some cases, the digital design template recommendation system 102 on the server(s) 104 gathers data for the creative segment classification system 110 and the template classification system 112. The digital design template recommendation system 102 then, via the server(s) 104, provides the creative segment classification system 110 and the template classification system 112 to the client device 106. In other words, the client device 106 obtains (e.g., downloads) the creative segment classification system 110 and the template classification system 112 from the server(s) 104. Once downloaded, the digital design template recommendation system 102 on the client device 106 utilizes the creative segment classification system 110 and the template classification system 112 to generate recommendations for digital design templates.

In alternative implementations, the digital design template recommendation system 102 includes a web hosting application that allows the client device 106 to interact with content and services hosted on the server(s) 104. To illustrate, in one or more implementations, the client device 106 accesses a software application supported by the server(s) 104. In response, the digital design template recommendation system 102 on the server(s) 104 generates and provides one or more recommendations for application features. The server(s) 104 then provides the recommendations to the client device 106 for display.

To illustrate, in some cases, the digital design template recommendation system 102 on the client device 106 collects and aggregates one or more user signals reflecting a behavior with respect to a software application supported by the server(s) 104. The client device 106 transmits the aggregation (e.g., a de-duplicated timestamp history of events) to the server(s) 104. In response, the digital design template recommendation system 102 on the server(s) 104 further aggregates the behavioral signals, determines a user context from the aggregation, and generates and provides one or more recommendations for application features.

Indeed, the digital design template recommendation system 102 is able to be implemented in whole, or in part, by the individual elements of the system 100. Indeed, although FIG. 1 illustrates the digital design template recommendation system 102 implemented with regard to the server(s) 104, different components of the digital design template recommendation system 102 are able to be implemented by a variety of devices within the system 100. For example, one or more (or all) components of the digital design template recommendation system 102 are implemented by a different computing device (e.g., the client device 106) or a separate server from the server(s) 104. Indeed, as shown in FIG. 1, the client device 106 includes the digital design template recommendation system 102. Example components of the digital design template recommendation system 102 will be described below with regard to FIG. 7.

Figure 2:
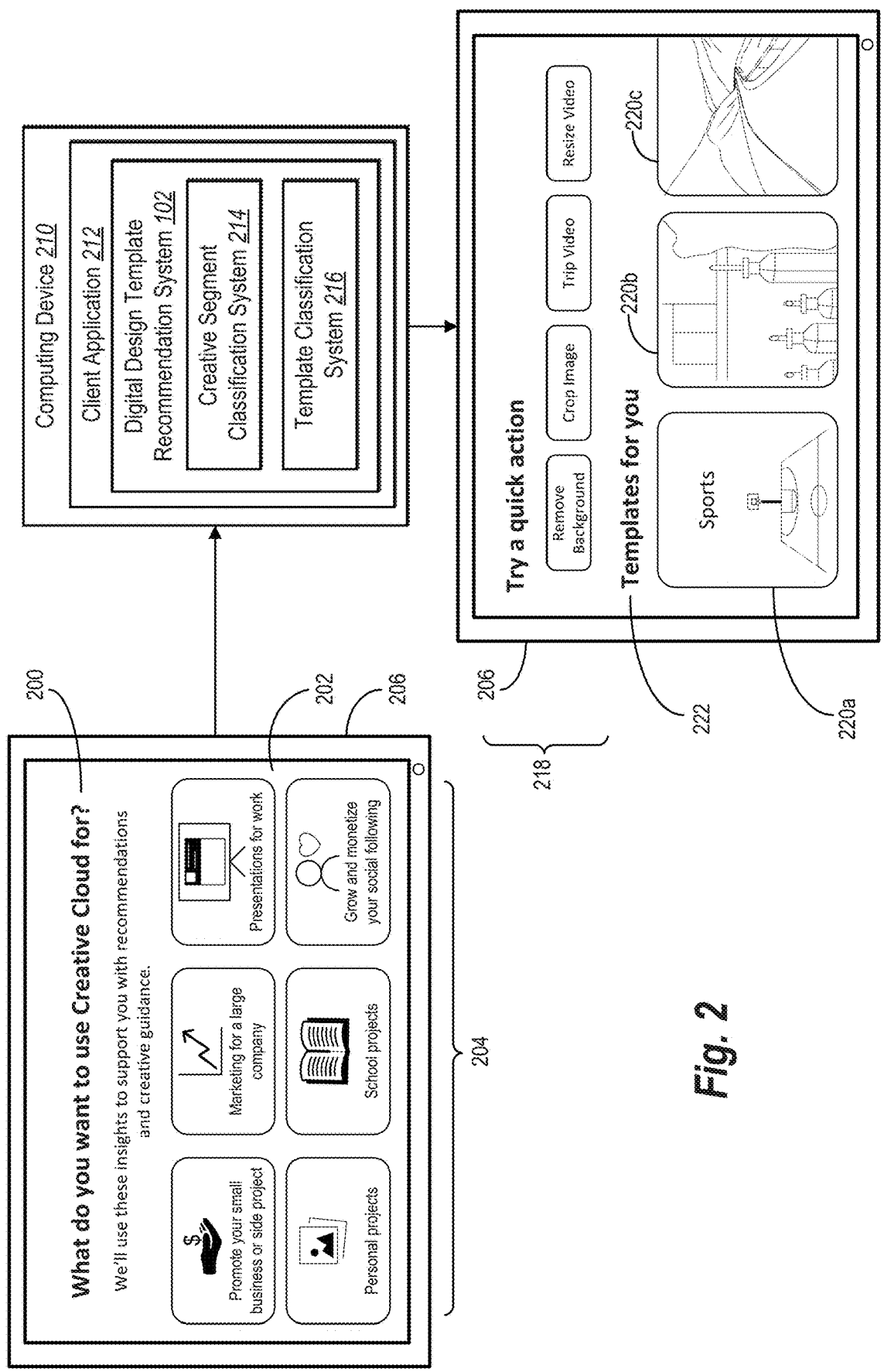
FIG. 2 illustrates an overview diagram of the digital design template recommendation system generating recommendations for digital design templates in accordance with one or more embodiments.

As mentioned, in one or more embodiments, the digital design template recommendation system 102 provides recommendations for digital design templates. In particular, in some embodiments, the digital design template recommendation system 102 provides the recommendations by generating a creative segment classification. FIG. 2 illustrates an overview diagram of the digital design template recommendation system 102 generating recommendations for digital design templates based on a user responding to a creative segment classification survey.

For example, as shown in FIG. 2, the digital design template recommendation system 102 provides a graphical user interface 204 for display on a client device 206. For example, in some cases, the graphical user interface 204 is associated with a particular software application, and the digital design template recommendation system 102 provides the graphical user interface 204 in response to accessing or detecting an access of the software application via the client device 206.

As further shown in FIG. 2, the digital design template recommendation system 102 optionally provides a creative segment classification survey 200 for display within the graphical user interface 204. In one or more embodiments, the creative segment classification survey 200 includes digital data fields stored locally on the client device 206 or a digital document that is stored remotely, such as on a separate computing device or the server(s) 104. Additionally, as shown, the digital design template recommendation system 102 provides creative segment classifiers 202 for display within the graphical user interface 204. In one or more embodiments, the creative segment classifiers 202 provides selectable options for indicating to the digital design template recommendation system 102 a creative segment classification of the user.

Thus, in one or more embodiments, the digital design template recommendation system 102 monitors behavior with respect to the software application by monitoring user interactions of the client device 206 (e.g., of a user of the client device 206) with the graphical user interface 204. For instance, in some cases, the digital design template recommendation system 102 monitors a user selection of creative segment classifiers 202. Further, in some embodiments, the digital design template recommendation system 102 monitors a user failing to make a selection of creative segment classifiers 202 when the digital design template recommendation system 102 presents the graphical user interface 204. As discussed above, the digital design template recommendation system 102 is able to monitor various other forms of in-application behavior as well, this is discussed in more detail below in FIG. 3.

As shown in FIG. 2, the digital design template recommendation system 102 analyzes responses to the creative segment classification survey 200. For example, as shown in FIG. 2, in some implementations, the digital design template recommendation system 102 operates on a computing device 210 (e.g., the server(s) 104 or the client device 106 discussed above with reference to FIG. 1 or some other mobile computing device, such as smart phone or tablet). Accordingly, in some embodiments, the digital design template recommendation system 102 receives a response to the creative segment classification survey 200 from the client device 206 at the computing device 210 and analyzes the survey response. As will be further discussed below, in some cases, the digital design template recommendation system 102 aggregates the survey response with other user signals and analyzes the resulting aggregation. In one or more embodiments, the digital design template recommendation system 102 utilizes the creative segment classification system 110 and the template classification system 112 to analyze the user signals (e.g., the aggregation).

As further shown in FIG. 2, the digital design template recommendation system 102 provides a graphical user interface 218 for display on the client device 206. Further, the digital design template recommendation system 102 provides the digital design template recommendations 220a-220c for display within the graphical user interface 218. In particular, the digital design template recommendation system 102 provides the recommendations 220a-220c for display within a visual recommendation component 222 of the graphical user interface 218. Indeed, in one or more embodiments, the digital design template recommendation system 102 provides the visual recommendation component 222 along with other tabs available to toggle between alternative recommendations based on the creative segment classification, though FIG. 2 only shows the visual recommendation component 222 for the current selected tab. For example, in some cases, the digital design template recommendation system 102 provides the visual recommendation component 222 with the recommendations 220a-220c for display as part of a side bar window associated with the software applications while using the editing features.

In some implementations, the digital design template recommendation system 102 generates and provides the recommendations 220a-220c in real time in response to receiving a response to the creative segment classification survey 200. For example, in some cases, the digital design template recommendation system 102 shows the graphical user interface 218 when determining that the client device 206 is navigating back to the landing page of the software application (rather than exiting the software application altogether) and selecting one of the creative segment classifiers 202. Accordingly, the digital design template recommendation system 102 generates and provides the recommendations 220a-220c by the time the client device 206 displays the landing page (e.g., the graphical user interface 218).

Figure 3:
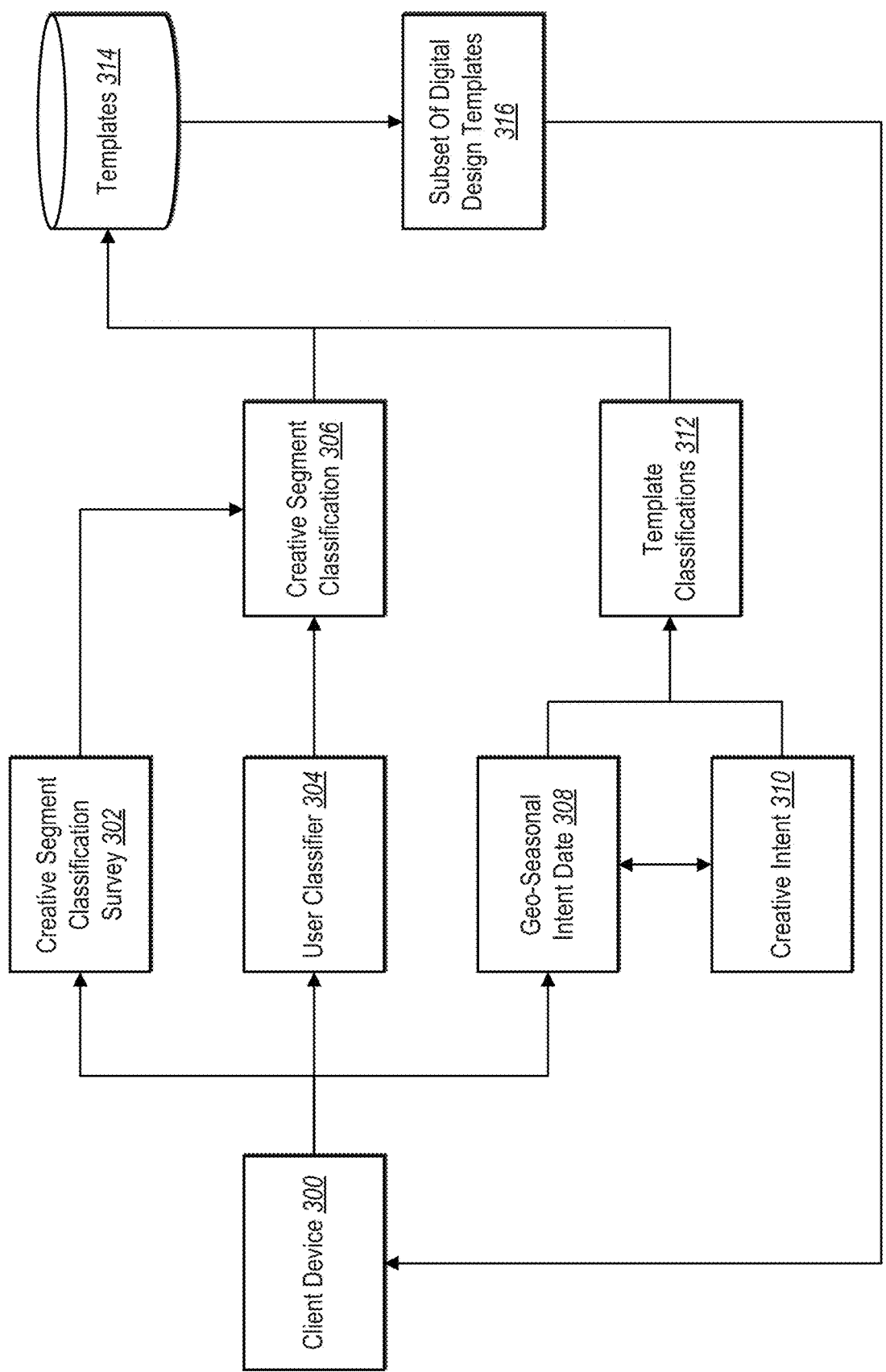
FIG. 3 illustrates a diagram for determining a subset of digital design templates based on a creative segment classification and template classifications in accordance with one or more embodiments.

As previously mentioned, in one or more embodiments, the digital design template recommendation system 102 identifies a subset of digital design templates from a plurality of digital design templates 314 based on creative segment classifications and template classifications. FIG. 3 illustrates a diagram for the digital design template recommendation system 102 providing a subset of digital design templates 316 to a client device 300 in accordance with one or more embodiments.

As just mentioned, the digital design template recommendation system 102 provides to a user digital design template recommendations. A digital design template is an existing digital design with one or more design features. For example, in one or more embodiments, a digital design template includes an overlay and an underlying image. In at least one embodiment, the digital design template recommendation system 102 stores a library of digital design templates.

As shown in FIG. 3, and as discussed above, the digital design template recommendation system 102 receives from the client device 300 a response to a creative segment classification survey 302. For example, in some implementations, the digital design template recommendation system 102 provides a broad categorization for the user to select from to indicate their creative purposes for using the software application for digital design templates. In particular, a user, in one or more embodiments selects from a list of categories with different creative intents. In other instances, the digital design template recommendation system 102 presents to the user a series of questions to determine a user's creative segment classification 306.

Indeed, to illustrate, the digital design template recommendation system 102 in one or more embodiments uses creative segment classifications in the survey such as "promote small business," "marketing for a large company," "presentation for work," "personal projects," "school projects," and "grow and monetize your social following." For each of the aforementioned classifications, the digital design template recommendation system 102 has a collection of digital design templates to begin with and further tailor/personalize over time.

As mentioned above, in other embodiments, the digital design template recommendation system 102 utilizes a series of questions. For example, rather than mere categories for the user to select from, the digital design template recommendation system 102 presents demographic questions and questions regarding the user's proficiency. In particular, the series of questions includes "age of user," "gender of user," "professional or personal use," "geographic location," "skill level," "usage time each day," and "experience of the user."

As also illustrated in FIG. 3, the digital design template recommendation system 102 receives from the client device 300 a user classifier 304. For example, in some implementations, the user classifier 304 refers to a non-survey response indication of the user's creative segment classification 306. In particular, the digital design template recommendation system 102 utilizes a user's clicks, previews, and exports to determine the creative segment classification 306. To illustrate, in some instances, the user elects to ignore the creative segment classification survey 302 and the digital design template recommendation system 102, determines the click, previews, and exports to infer the creative segment classification 306.

In one or more embodiments, the digital design template recommendation system 102 receives both the user classifier 304 and the response to the creative segment classification survey 302. In particular, the digital design template recommendation system 102 utilizes the user classifier 304 in combination with the response to the creative segment classification survey 302. To illustrate, the user classifier 304, in one or more embodiments indicates that the user previewed multiple holiday season digital design templates and the response in the creative segment classification survey 302 indicated the user as a marketer of a large corporation. Based on this information, the digital design template recommendation system 102 identifies a creative segment classification 306 for marketing at a large corporation and a sub-category of holidays. The combined user classifier 304 and the response to the creative segment classification survey 302 allows the digital design template recommendation system 102 to enhance its recommendations.

As discussed above, the creative segment classification 306 is based on a response to the creative segment classification survey 302 and the user classifier 304. Creative segment classification 306 refers to a category associated with a user that indicates probable creative intents of the user. For example, the creative segment classification 306 includes a user self-categorizing via a survey or prompt, (as discussed above), presented to the user upon opening the software application. In particular, if the user fails to self-categorize, the digital design template recommendation system 102 still generates a creative segment classification 306 (by using the above discussed user classifier 304). To illustrate, the digital design template recommendation system 102 utilizes data such as a user's initial digital design template previews, clicks within the interface, or any other actions to infer a creative segment classification 306 of the user. Furthermore, the digital design template recommendation system 102 determines the creative segment classification 306 using a creative segment classifier model, discussed in more detail below.

As just mentioned, the digital design template recommendation system 102 trains a machine learning model to assign creative segment classification 306. For example, the machine learning model includes a neural network or a random forest model. In one or more embodiments, a machine learning model refers to a computer representation that that is tunable (e.g., trained) based on inputs to approximate unknown functions. In particular, in some embodiments, a machine learning model refers to a model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, the digital design template recommendation system 102 trains a creative segment classifier model to assign creative segment classification 306. In particular, the digital design template recommendation system 102 utilizes curated collections per creative segment classification 306, responses to the creative segment classification survey 302, and user classifier 304 (e.g., clicks, previews, and exports). To illustrate, the digital design template recommendation system 102 via the creative segment classifier encodes curated collections per creative segment classification 306, responses to the creative segment classification survey 302, and the user classifier 304, such as prior user clicks within the software application, prior user views of different digital design templates, and prior user exports (e.g., using one hot encoding, an encoding layer, or a vector mapping) and then process the encoding utilizing the creative segment classifier model to determine a different creative segment classifications.

Curated collections refer to a pre-determined set of digital design templates to be recommended. In particular, a curated collection includes a pre-determined set of digital design templates or digital design template categories from which one or more recommendations are to be generated. In some cases, a curated collection corresponds to a plurality of users. For instance, in some implementations, the digital design template recommendation system 102 generates one or more recommendations for a plurality of users using a curated collection.

To elaborate on the curated collections per creative segment classification 306, the digital design template recommendation system 102 collects analytics regarding users/designer segments and digital design templates curated for each creative segment. For example, the digital design template recommendation system 102 utilizes the curated collections per creative segment classification 306 as a starting point for providing recommendations. In particular, as already discussed above, the curated collections are used together with the response to the creative segment classification survey 302 and the user classifier 304.

Furthermore, in one or more embodiments, the digital design template recommendation system 102 provides a graphical user interface to users/designers to allow the users/designs to curate digital design templates for specific creative segment classifications. In particular, the digital design template recommendation system 102 provides tools for (i) digital design templates to add machine tags to each digital design template, (ii) date/time tags for when the curation occurred, (iii) categories (marketing, promotions, sales, business, school, etc.), and (iv) types (seasonal, commerce, educational, celebratory, contemporary, etc.). To illustrate, a user/designer provided with the graphical user interface tools to curate digital design templates for different creative segments, adds the appropriate tags and classifiers and saves their work. In doing so, the digital design template recommendation system 102 utilizes this data to further train its creative segment classifier model. Note that the digital design template recommendation system 102 utilizes the aforementioned machine learning principles to further personalize the curated collections per creative segment classification 306.

As shown in FIG. 3 and as also discussed above, the digital design template recommendation system 102 determines geo-seasonal intent data 308. Geo-seasonal intent data 308 refers to data specifically linked to a geographic locale and season. For example, the digital design template recommendation system 102 determines geo-seasonal intent data by counting the number of unique exports for digital design templates for a geographic locale in a given time period. In particular, the time period comprises a week. As shown in FIG. 3, the digital design template recommendation system 102 receives geo-seasonal intent data 308 in part from the client device 300. The client device 300 stores geo-seasonal intent data such as the applicable geographic locale and time period. To further illustrate geo-seasonal intent data 308, in the United States during the $46^{th}$ week (the month of November), Thanksgiving digital design templates are typically surfaced as relevant geo-seasonal data. In India, during the $43^{rd}$ week (the month of October), Diwali digital design templates are typically surfaced as relevant geo-seasonal data. Moreover, in one or more embodiments, the digital design template recommendation system 102 utilizes geo-seasonal data with trending global data. More details regarding determining geo-seasonal intent data and training the digital design template recommendation system 102 to recognize seasonal vs. non-seasonal templates is discussed in more detail in FIG. 4A-4D.

As mentioned above and as shown in FIG. 3, the digital design template recommendation system 102 generates template classifications 312 based on geo-seasonal intent data 308 and creative intent 310. In one or more embodiments, "creative intent" 310 refers to a creative purpose of a digital design template. For example, "creative intent" 310 of a digital design template includes templates used for promotions, sales, flyers, invitations, or certain holidays. In particular, the digital design template recommendation system 102 determines creative intent 310 of digital design templates by identifying prior uses of digital design templates, and key descriptive words used by designers to describe digital design templates. To illustrate, in one or more embodiments, the digital design template recommendation system 102 subdivides creative intents into topics and tasks to identify a topic (e.g., Black Friday) and a task (e.g., sales promotion). Based on the creative intents, each digital design template has multiple topics and tasks and the digital design template recommendation system 102 utilizes the creative intents of the digital design templates to determine creative purposes of the user accessing a specific digital design template.

FIG. 3 illustrates the digital design template recommendation system 102 utilizing both the geo-seasonal intent data 308 and the creative intent 310 to generate the template classifications 312. In one or more embodiments, template classifications 312 refer to a categorization of digital design templates that indicate probable creative purposes of the template. For example, the digital design template recommendation system 102 determines template classifications 312 based on creative intent 310 and geo-seasonal intent data 308. In particular, based on the creative intent 310 and geo-seasonal intent data 308, the digital design template recommendation system 102 assigns template classifications 312 to a digital design template. To illustrate, the digital design template recommendation system 102 associates a template classification for each digital design template and determines whether a digital design template is relevant based on matching template classifications 312 with creative segment classifications.

In one or more embodiments, the digital design template recommendation system 102 generates template classifications 312 with a machine learning model. The machine learning model principles were discussed earlier in context of the creative segment classification 306, the same principles apply here. For example, the digital design template recommendation system 102 trains a template classification model to assign template classifications 312. In particular, the digital design template recommendation system 102 utilizes the creative intent 310 and the geo-seasonal intent data 308. To illustrate, the digital design template recommendation system 102 via the template classification model encodes creative intent 310 and the geo-seasonal intent data 308 (e.g., using one hot encoding, an encoding layer, or a vector mapping) and then processes the encoding utilizing the template classification model to determine different template classifications 312. For differentiation purposes, template classifications 312 refers to the creative purposes of the digital design template whereas the creative segment classification 306 relates to the user's creative purposes. However, in one or more embodiments, there is overlap between the data used to train the template classification model and data used to train the creative segment classification model.

As illustrated by FIG. 3, the digital design template recommendation system 102 aggregates the creative segment classification 306 and the template classifications 312 to identify a subset of digital design templates 316 for recommendation to the client device 300. The following description is an example embodiment of the digital design template recommendation system 102 utilizing both the creative segment classification 306 and the template classifications 312 to identify the subset of digital design templates 316 from the plurality of digital design templates 314.

For example, in one or more embodiments, the digital design template recommendation system 102 assigns a creative segment classification 306 of "small business." As discussed above, the digital design template recommendation system 102 assigns "small business" due to a user response to the creative segment classification survey 302 of "small business" and due to the user classifier 304 indicating the same classification. In this instance, the digital design template recommendation system 102 also determines that it is the end of spring season with an upcoming $4^{th}$ of July holiday. This comprises the geo-seasonal intent data (e.g., U.S.A. and $4^{th}$ of July holiday).

Moreover, the digital design template recommendation system 102 also determines the creative intent 310, because even though the digital design template recommendation system 102 classifies the user as "small business" the creative intent 310 varies from promoting the small business, making sales, creating a flyer for the small business, highlighting a specific deal for a holiday, etc. In this instance, if the digital design template recommendation system 102 determines the creative intent 310 as holiday sale, then the digital design template recommendation system 102 utilizes holiday sale with the geo-seasonal intent data 308 and determines a template classification 312 of July $4^{th}$ holiday sale. Due to the creative segment classification 306 of small business, the digital design template recommendation system 102 utilizes the July $4^{th}$ holiday sale template classifications 312 with the small business creative segment classification 306, giving particular weight to the template classification (due to the creative intent 310) to identify a relevant subset of digital design templates 316. In particular, the relevant subset of digital design templates 316 comprises of July $4^{th}$ graphics such as fireworks and barbeques with sales information, such as 20% off.

On the other hand, if the digital design template recommendation system 102 determines that the creative intent 310 is promotion, e.g., promotion of the small business (the creative segment classification 306), then the digital design template recommendation system 102 gives less weight to the geo-seasonal intent data 308. In particular, the digital design template recommendation system 102 identifies a relevant subset of digital design templates 316 by providing digital design templates 314 focused on promotional template designs with a secondary priority towards the geo-seasonal data, e.g., secondary priority to the $4^{th}$ of July promotional template designs. In other embodiments, this varies depending on other factors such as the user classifier 304. For example, if the user classifier 304 indicates that the small business disregards holiday digital design templates, then less weight is given to the geo-seasonal intent data 308, while if the user classifier 304 indicates that the small business highly regards holiday digital design templates (based on their previews and exports), then more weight is given to the holiday templates.

As illustrated by FIG. 3, when the digital design template recommendation system 102 identifies the subset of digital design templates 316 from the plurality of digital design templates 314, the digital design template recommendation system 102 provides for display to the client device 300, the subset of digital design templates 316 as recommendations. To further illustrate, the digital design template recommendation system 102 displays the recommendation graphical user interface shown in FIG. 2.

Figure 4A:
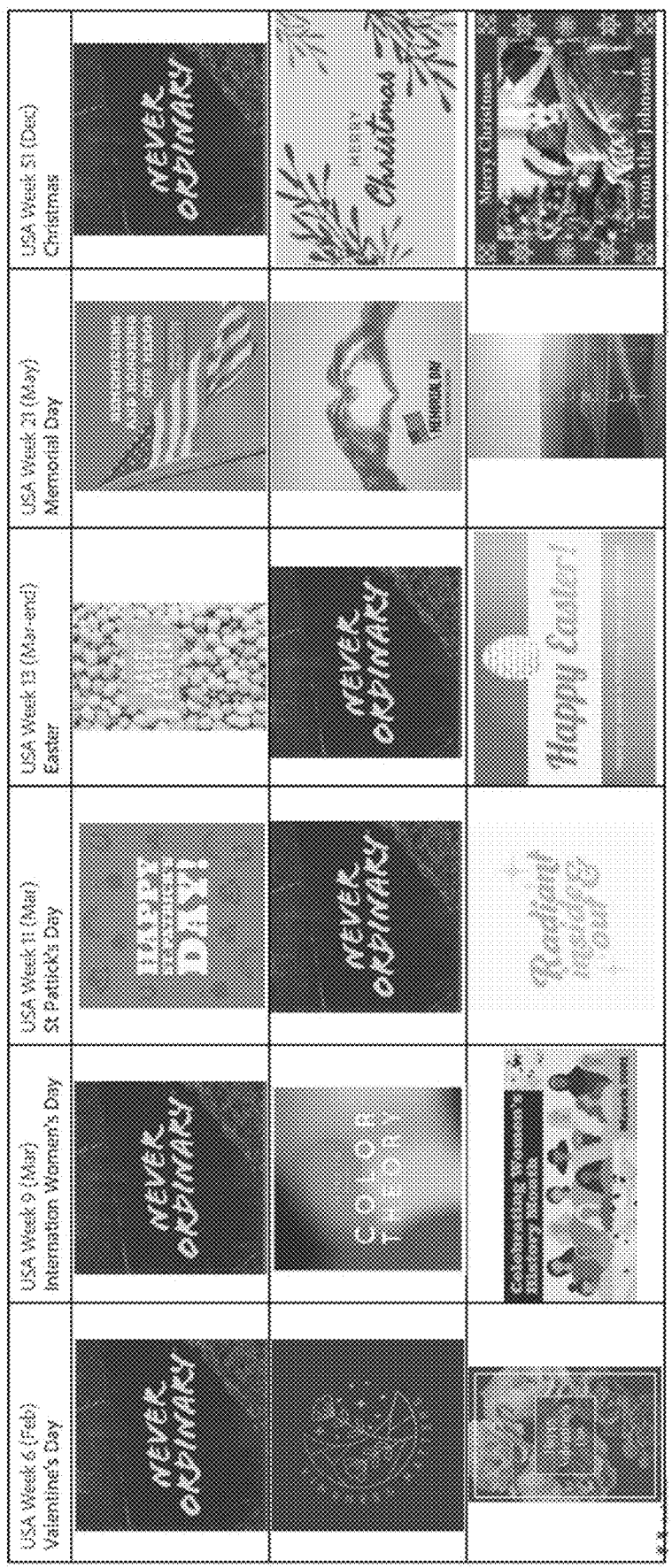
FIG. 4A-4D illustrates a diagram for the digital design template recommendation system utilizing geo-seasonal intent data in accordance with one or more embodiments.
Figure 4B:
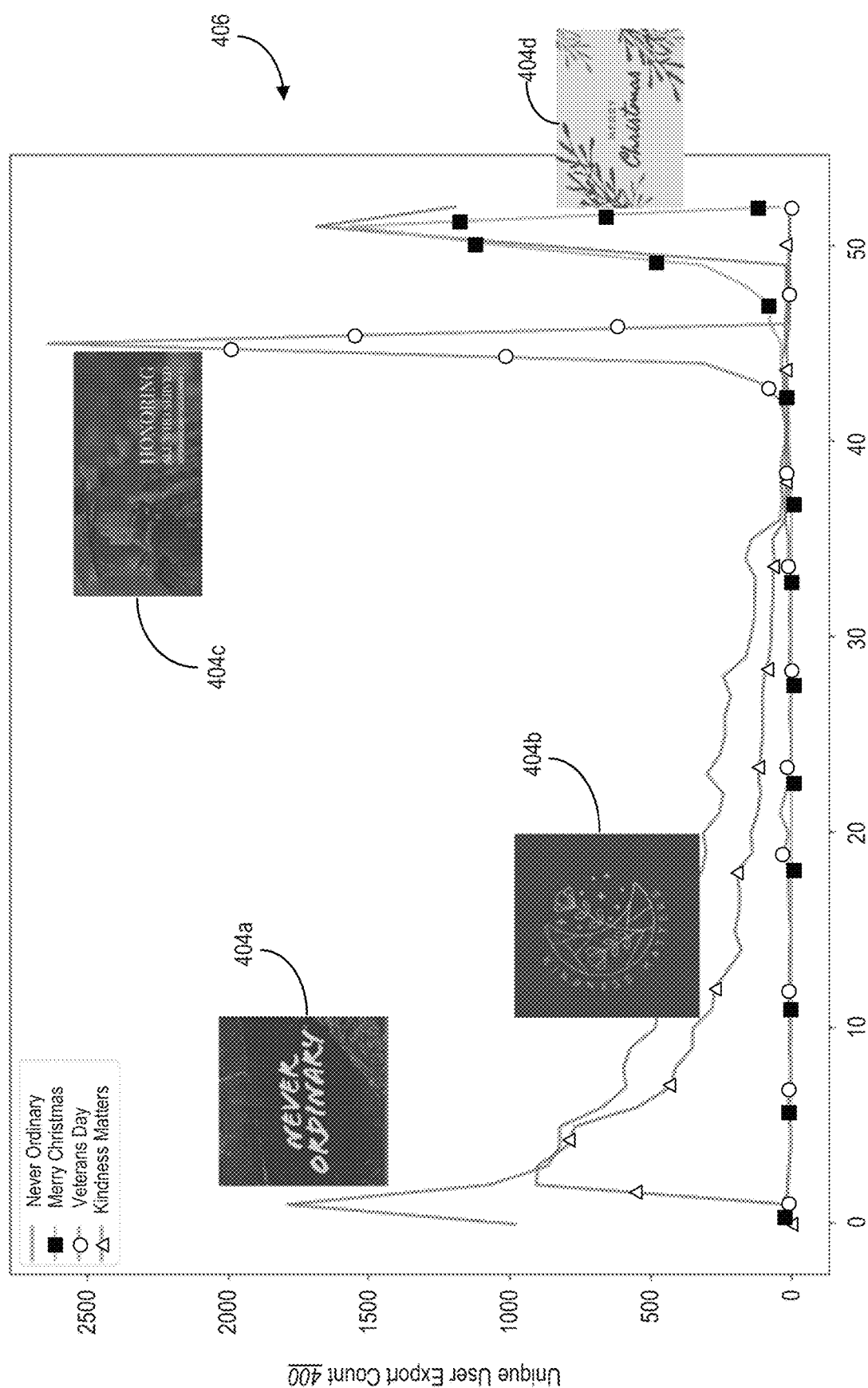

Continuing to FIG. 4A, FIG. 4A illustrates geo-seasonal intent data for digital design templates prior to processing with the model described in FIG. 4B. For example, FIG. 4A shows in one or more embodiments, different significant geo-seasonal holidays with popular digital design templates for each geo-seasonal holiday. In particular, FIG. 4A depicts Valentine's Day for week 6, International Women's Day for week 9, Easter for week 13, Memorial Day for week 21, and Christmas for week 51. For each of the aforementioned holidays, FIG. 4A depicts applicable/relevant digital design templates, but it also depicts digital design templates such as "Never Ordinary," "Color Theory," and "Kindness Matters." In particular, this is an issue because these templates likely do not represent a seasonal template, but rather one that is merely trending for the current year. To resolve this, the digital design template recommendation system 102 segments between seasonal and non-seasonal templates.

In one or more embodiments, seasonal template refers to a digital design template that is significantly exported by unique users during a given time period and satisfies a predetermined threshold. In particular, a digital design template is considered "seasonal" when it satisfies a predetermined threshold. To illustrate, a template is considered seasonal when based on min-max scaler, the value of the template results in the absolute value being less than or equal to a predetermined threshold. In one or more embodiments, the value of the template results is the spread of the middle half of the distribution for a given template (interquartile range).

As alluded to in the last paragraph, if the digital design template recommendation system 102 does not classify a digital design template as seasonal, then the digital design template is non-seasonal. In one or more embodiments "non-seasonal" template refers to a digital design template that is not significantly exported by unique users during a given time period and/or does not satisfy a predetermined threshold. For example, a digital design template could have a significant number of unique exports during a given time period (e.g., one week), but does not satisfy a predetermined threshold. Accordingly, in this situation, the digital design template is classified as non-seasonal.

Figure 4C:
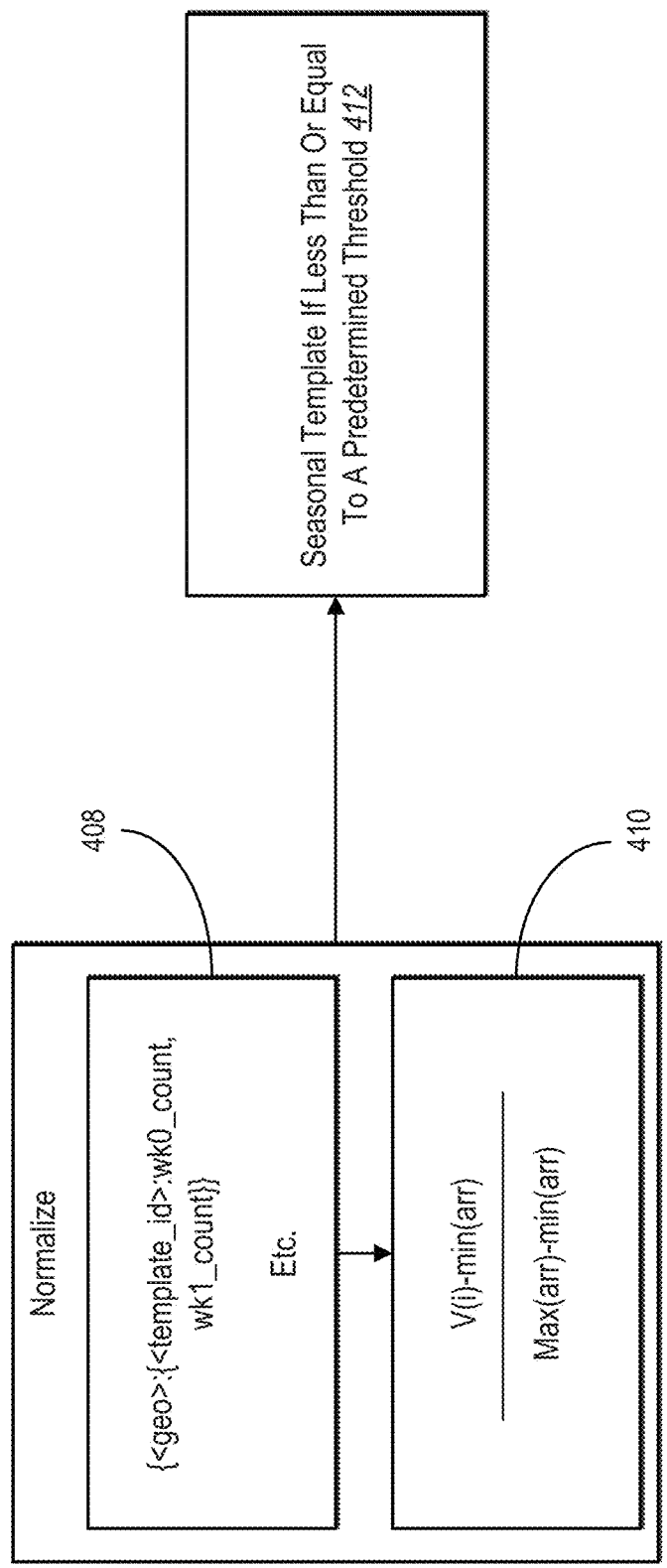

As previously mentioned, in one or more embodiments, the digital design template recommendation system 102 determines geo-seasonal intent data and identifies seasonal templates from non-seasonal templates. FIGS. 4B and 4C illustrates a diagram of the digital design template recommendation system 102 identifying apparent geo-seasonal templates and utilizing a min-max scaler to normalize values for segregating seasonal templates from non-seasonal templates in accordance with one or more embodiments. For example, the digital design template recommendation system 102 utilizes the data in graph 406 within a model to normalize the values and determine which templates are seasonal in nature. In particular, the digital design template recommendation system 102 utilizes a seasonal significance model.

Geo-seasonal intent data was previously discussed in FIG. 3. FIGS. 4B and 4C further illustrates how the digital design template recommendation system 102 defines data that comprises of geo-seasonal intent data and the process utilized to remove digital design templates irrelevant to geo-seasonal intent data. For example, as similarly discussed in FIG. 3, in one or more embodiments, the digital design template recommendation system 102 identifies for each digital design template a unique user export count 400 and a time period 402. In particular, the digital design template recommendation system 102 utilizes these two dimensions in a graph 406, where the time period 402 is the x-axis and the unique user export count 400 is the y-axis.

To illustrate, FIG. 4B shows the graph 406 with different digital design templates. The digital design templates 404a-404d each show a spike in the unique user export count 400 during certain times of the year. For example, the digital design template 404c depicts a digital design template of "Honoring All Who Served." The digital design template 404c is a digital design template indicative of the U.S. holiday Veterans Day. As such, the spike during November indicates to the digital design template recommendation system 102 of the digital design template 404c's seasonality. Likewise, digital design template 404d depicts a digital design template of "Merry Christmas," which spikes during the month of December. Accordingly, this also indicates digital design template 404d's seasonality. On the other hand, digital design template 404a and 404b depict a digital design template of "Never Ordinary" and "Kindness Matters," respectively. Both templates have a respective spike around January-February, but do not explicitly indicate that they are seasonal in nature.

In one or more example embodiments the digital design template recommendation system 102 generates a length vector 408 for each digital design template and normalizes each array of the length vector with a scaler 410. In particular, the length vector 408 spans each week of a year and comprises export counts per geographic locale. To illustrate, each array is identified by a template ID and each array contains week 0, week 1, week 2, etc. with the number of digital design templates exported for each respective week.

As discussed above, in one or more embodiments, the digital design template recommendation system 102 utilizes each array of the vector within the scaler 410. For example, the scaler 410 includes a min-max scaler with a single feature of the length vector subtracted by a minimum value of the array divided by the difference between the range of the array values (e.g., the maximum value of the array minus the minimum value of the array). In particular, the min-max scaler in one or more embodiments is represented by the following equation:

$$v(\text{scaled}) = \frac{v(i) - \min(arr)}{\max(arr) - \min(arr)}$$

To illustrate, v(i) in the above-mentioned equation represents a single variable feature such as the number of unique user export counts of a given digital design template for the predetermined period. Each min and max value are the minimum and maximum export counts for the array of the vector, such as for example, if for the entire array the minimum exports occurred on week 24 and the maximum exports occurred on week 2 than those values are utilized in the min-max scaler.

As also shown in FIG. 4B, the digital design template recommendation system 102 determines whether a given digital design template is a seasonal template based on a predetermined threshold 412. For example, if the min-max scaler generates a v(scaled) value less than or equal to the predetermined threshold 412, then the digital design template recommendation system 102 determines it is a seasonal template. However, if the min-max scaler generates a v(scaled) greater than the predetermined threshold 412, then the digital design template recommendation system 102 determines it is a non-seasonal template. In particular, in one or more embodiments, the predetermined threshold 412 is less than or equal to 2%. To illustrate, the classification logic utilized by the digital design template recommendation system 102 is taking an absolute value of v(Scaled) to determine whether it is less than or equal to 2%. If so, then the digital design template is seasonal, if not, then the digital design template is non-seasonal.

Figure 4D:
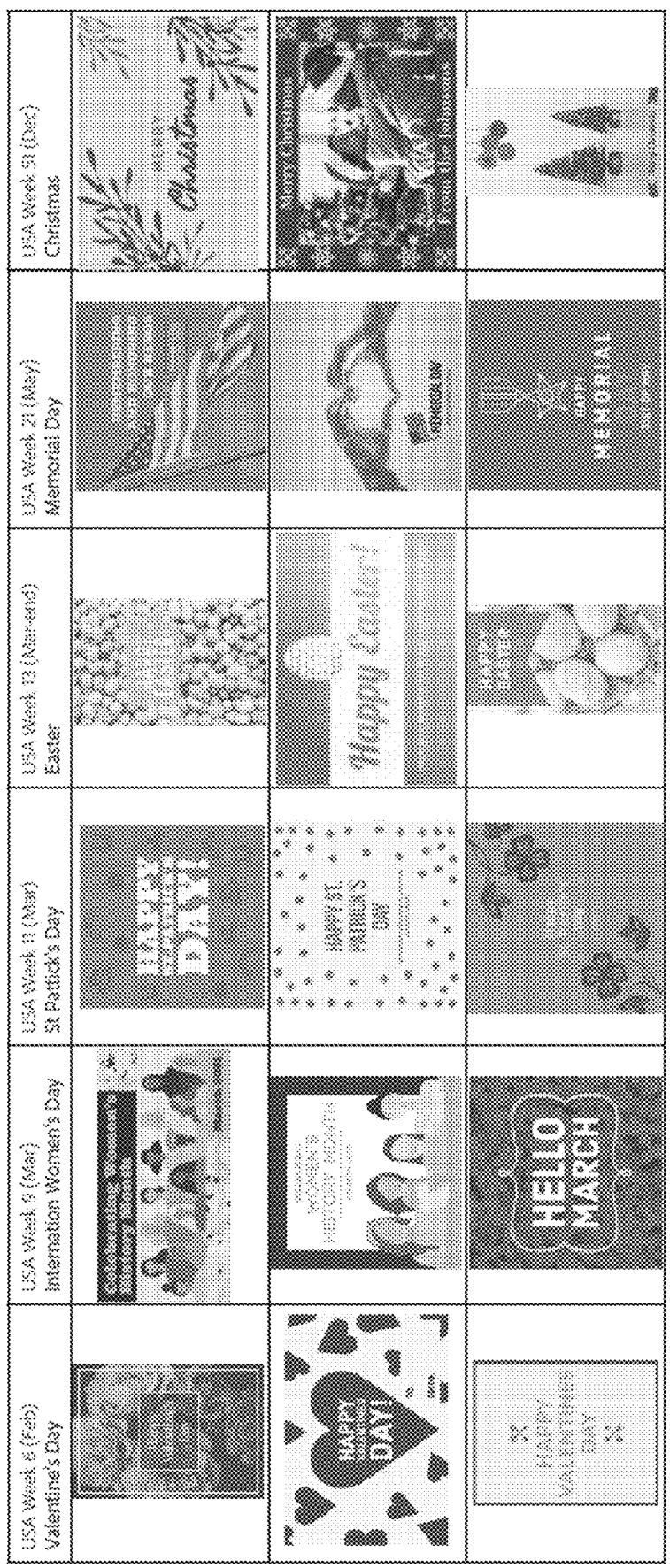

As is shown in FIG. 4D, after application of the seasonal significance model to the results shown in FIG. 4A, the digital design template recommendation system 102 improves its geo-seasonal data. For each of the holidays depicted in FIG. 4D, templates such as "Never Ordinary," "Color Theory," and "Kindness Matters" no longer show up as relevant even though those templates had a high number of unique exports. The scaler 410 utilized in FIG. 4C normalizes the unique export values to segment seasonal templates from non-seasonal templates.

Figure 5:
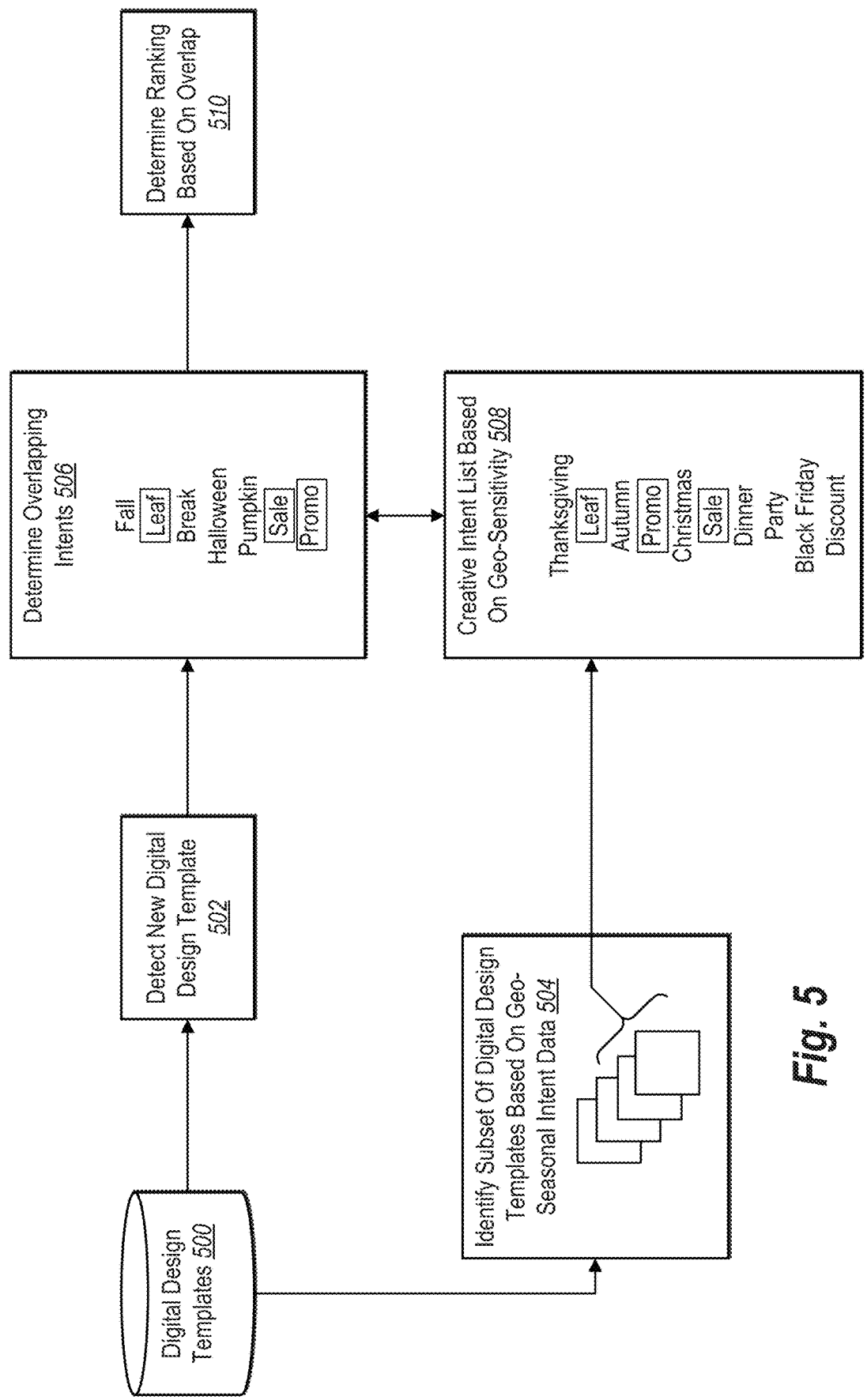
FIG. 5 illustrates a diagram of the digital design template recommendation system determining intent-based re-ranking for a new digital design template in accordance with one or more embodiments.

As previously discussed, the digital design template recommendation system 102 re-ranks a plurality of digital design templates when the digital design template recommendation system 102 detects a new digital design template. As shown in FIG. 5, the digital design template recommendation system 102 determines a ranking for a new digital design template 502 based on overlapping intents of the new digital design template 502 with the existing digital design templates.

As shown in FIG. 5, the digital design template recommendation system 102 detects the new digital design template 502. In one or more example embodiments, a user adds the new digital design template 502 to a plurality of digital design templates 500. In particular, a user adds the new digital design template 502 by uploading a digital design to a public server of the digital design template recommendation system 102. The new digital design template 502 includes digital design templates not currently part of the plurality of digital design templates 500. To illustrate, the digital design template recommendation system 102 provides a survey or a series of questions to a user in response to uploading the new digital design template 502. The survey or series of questions allows for the user to categorize the new digital design template 502. Additionally, or alternatively, the digital design template recommendation system 102 utilizes the principles discussed in FIG. 3 to determine a template classification of the new digital design template e.g., the digital design template recommendation system 102 determines a creative intent of the digital design template). The presence of the new digital design template 502 triggers the digital design template recommendation system 102 to perform a re-ranking of relevant digital design templates.

As just mentioned, the digital design template recommendation system 102 performs a re-ranking based on the new digital design template 502. In one or more example embodiments, the digital design template recommendation system 102 performs an act 504 of identifying a subset of digital design templates based on geo-seasonal intent data. In particular, the act 504 of identifying the subset of digital design templates, identifies a relevant subset by utilizing information such as the geographic locale for a given time period (typically a week). To illustrate, the digital design template recommendation system 102 receives the new digital design template 502 during the week of Halloween in the U.S. and thus the digital design template recommendation system 102 identifies a subset of digital design templates from the plurality of digital design templates 500.

As also illustrated in FIG. 5, based on the act 504, the digital design template recommendation system 102 generates a creative intent list 508 based on the geo-seasonality. In one or more example embodiments, the creative intent list 508 includes a list of words, tokenized and lemmatized for each geographic locale-week combination. In particular, for a given digital design template related to Thanksgiving, the creative intent list includes curated phrases. To illustrate, the curated phrases include phrases given to a specific digital design template by a user/designer who uploaded or utilized the digital design template.

To further illustrate, for a Thanksgiving digital design template, the creative intent list includes words such as "orange," "leaves," "white," "seasonal," "happy," "thanksgiving," "from," "autumn," "leaf," and "brown." The digital design template recommendation system 102 tokenizes and lemmatizes each of the words in the list. For example, the digital design template recommendation system 102 ranks the list as follows: "thanksgiving: 69," "leaf: 38," "autumn: 34," "Christmas: 29," "promo: 29," "sale: 29," "dinner: 28," "party: 27," "blackfriday: 24," and "discount: 21." Note that the digital design template recommendation system 102 performs this tokenization and lemmatization for each of the digital design templates in the identified subset of digital design templates.

By tokenizing and lemmatizing each of the digital design templates in the identified subset of digital design templates, the digital design template recommendation system 102 performs an act 506 of determining overlapping intents between the new digital design template 502 and the subset of digital design templates. For example, the digital design template recommendation system 102 determines a creative intent list for the new digital design template 502 by identifying user upload answers to surveys, answers to a series of questions, or other identifiers such as user classifiers. To illustrate, the digital design template recommendation system 102 determines that the creative intent list for the new digital design template 502 includes "fall," "leaf," "break," "Halloween," "pumpkin," "sale," and "promo." To further illustrate with the above given example of the Thanksgiving digital design template, the digital design template recommendation system 102 determines which words in the creative intent list of the new digital design template 502 overlaps with the creative intent list of the subset of digital design templates. For example, in one or more implementations, the digital design template recommendation system 102 determines a frequency of overlapping creative intents. In particular, the digital design template recommendation system 102 determines an overlap score based on a frequency of overlapping creative intents in a given week and then determines an overall score per template.

As illustrated in FIG. 5, the digital design template recommendation system 102 performs an act 510 of determining a ranking of the new digital design template 502. In the above given example embodiment, the words "leaf," "sale," and "promo" overlap between the two digital design templates. The digital design template recommendation system 102 compares the creative intent list for the new digital design template 502 with each of the digital design templates in the subset of digital design templates. The digital design template recommendation system 102 determines a ranking of the new digital design template 502 by identifying where the most amount of overlap occurs and by calculating the overall overlap score for the new digital design template 502.

Figure 6:
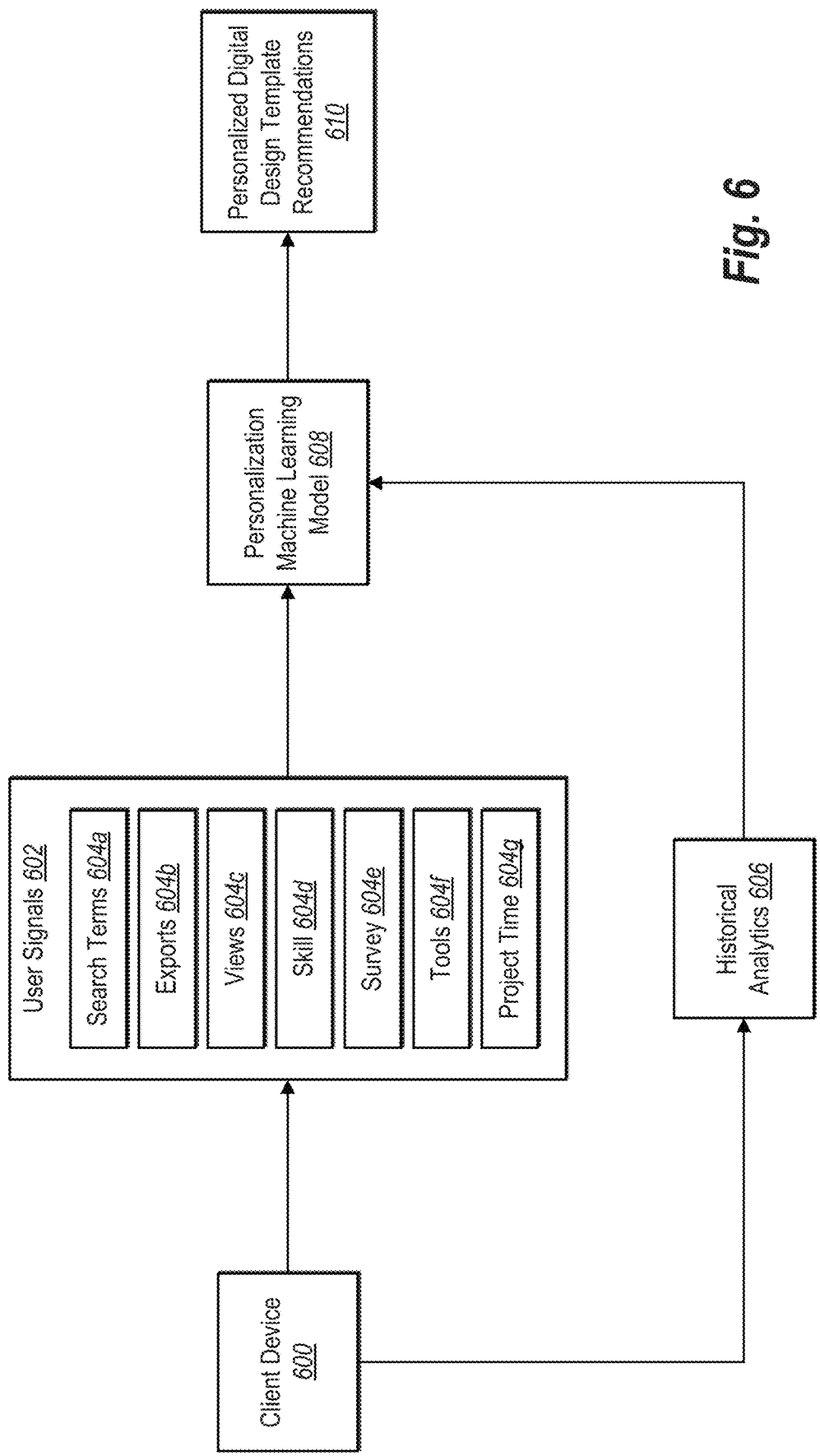
FIG. 6 illustrates a diagram of the digital design template recommendation system generating a personalized digital design template recommendation by utilizing a personalization machine learning model in accordance with one or more embodiments.

As previously discussed, the digital design template recommendation system 102 tailors and personalizes digital design templates by utilizing a personalization machine learning model 608. For example, as shown in FIG. 6, the digital design template recommendation system 102 receives from a client device 600 user signals 602. User signals 602 refers to digital data related to behavior with respect to a software application. In particular, in some embodiments, user signals 602 refers to in-application behavior of a user (e.g., performed via a client device). Indeed, in some cases, user signals 602 refers to digital data that reflects user interactions with a software application. For instance, in some cases, user signals reflect actions performed within a software application, documents or other content accessed via a software application, content consumed via a software application, and/or settings established within a software application. To illustrate, in some instances, user signals 602 include, but is not limited to, digital data that reflects a content consumption (e.g., a content click, a browsing history, a content view, etc.), a tool usage, a property of the file in the software application (e.g., a tag or classification associated with a digital document, an object portrayed in a digital document, etc.), a user preference, a user intent, a creative category, or a skill level. In some cases, the digital design template recommendation system 102 determines user signals 602 (e.g., user intent) from one or more other user signals. FIG. 6 shows user signals 602 including elements 604*a*-604*g* (e.g., search terms, exports, views, skill, survey, tools, and project time).

User signals 602 also includes real-time data not processed as analytics in the digital design template recommendation system 102. In one or more embodiments, real-time data refers to a user's interactions with the digital design template recommendation system 102 that have not been processed by an analytics system. For example, real-time data includes clicks, previews, exports, tool/feature usage within a short duration that the digital design template recommendation system utilizes to make recommendations. In particular, a short duration includes a length of time that comprises seconds or minutes. To illustrate, a user accesses the digital design template recommendation system, then begin to perform user actions (e.g., previewing templates or using certain features), in response the digital design template recommendation system processes this real-time data to provide recommendations to the user based on the real-time data. Furthermore, in one or more embodiments, the digital design template recommendation system 102 variably adds a weight to each user signal. This assists in prioritizing more important user signals for making recommendations. Moreover, in one or more embodiments the digital design template recommendation system 102 utilizes an application programming interface (API) to query the real-time data of a user. Note that although real-time data is discussed in relation to FIG. 6, in one or more embodiments, real-time data is also utilized determining the creative segment classification (e.g., creative segment classification 306 discussed in FIG. 3).

As further shown in FIG. 6, the digital design template recommendation system 102 utilizes historical analytics 606 in addition to the user signals 602. In one or more embodiments, historical analytics refers to user derivable signals. For example, historical analytics represent different indicators of a user's interaction with the digital design template recommendation system. In particular, historical analytics includes interest based on past exports, task performed by the user, the version of the application (premium or free), the skill level of the user, usage over time, and different tools/features employed. To illustrate, the digital design template recommendation system incorporates historical analytics in a personalization machine learning model to further tailor digital design template recommendations.

In utilizing the user signals 602 and the historical analytics 606, the digital design template recommendation system 102 utilizes the personalization machine learning model 608. The personalization machine learning model 608 utilizes the same machine learning principles as those discussed above in FIGS. 3 and 4C. In particular, in some embodiments, the personalization machine learning model 608 refers to a computer-implemented model that generates recommendations based on the interests and/or behaviors of a single user. To illustrate, in some cases, the personalization machine learning model 608 recommends application features associated with one or more software applications based on the interests and/or behaviors of a single user with respect to the software application(s). In some cases, the personalization machine learning model 608 includes parameters that reflect the interests and/or behaviors of the corresponding population of users. Further, in some instances, the personalization machine learning model 608 filters a set of recommendations generated from another model (e.g., a global recommendation model) to determine which of those recommendations to provide to a user in accordance with the personal preferences of the user (e.g., to determine which of the recommendations are best suited for the user based on the personal preferences).

To illustrate the above, the digital design template recommendation system 102 via the personalization machine learning model 608 encodes user signals 602 and historical analytics 606 (e.g., using one hot encoding, an encoding layer, or a vector mapping) and then processes the encoding utilizing the personalization machine learning model 608 to determine a personalized digital design template recommendation 610.

To process and personalize the digital design template recommendations, the digital design template recommendation system 102 aggregates data. In one or more embodiments aggregation refers to digital data reflecting a set of user signals associated with the same user (e.g., associated with a client device or set of client devices of the same user). In some cases, an aggregation includes a set of raw, unprocessed user signals. In some implementations, however, an aggregation includes digital data that results from processing a set of user signals. For example, in some instances, an aggregation includes a de-duplicated history of events generated from a set of user signals. Further, in some embodiments, an aggregation includes one or more statistics derived from a set of user signals, such as statistics that indicate one or more behavior trends (e.g., daily tools used, lifetime tools used, image types used, daily/weekly intent categories, etc.). In some cases, an aggregation corresponds to a set of user signals across a particular time window. In some implementations, however, an aggregation corresponds to all user signals associated with a particular user.

In aggregating, the personalization machine learning model 608 utilizes the data discussed in FIG. 3 (creative segment classification survey 302, user classifier 304, geo-seasonal intent data 308, and creative intent 310) in combination with the user signals 602 and the historical analytics 606 to generate the personalized recommendations.

Furthermore, the digital design template recommendation system 102 blends the aforementioned data sources discussed in the last paragraph and in one or more implementations applies different weights. In particular, depending on the number of results for each for each of the creative segment classification survey, user classifier, geo-seasonal intent data, and creative intent, user signals 602, and historical analytics 606—the digital design template recommendation system 102 applies a different weight signifying the importance of that metric to determine digital design template recommendations. To illustrate, based on the recommendations generated by the personalization machine learning model 608, the digital design template recommendation system shows a subset of digital design templates based on popularity. Alternatively, the digital design template recommendation system 102 randomizes the order of the subset of digital design template recommended to provide the user with refreshed content each time the user accesses the software application.

Additionally, in one or more example embodiments, the digital design template recommendation system 102 makes event probability-based recommendations for the user based on a machine learning model. For example, the digital design template recommendation system 102 determines prior user exports of digital design templates and prior user views of digital design templates. In particular, the digital design template recommendation system 102 based on the determination utilizes an exponential decay function that gives more weight to recent user actions (e.g., user exports and user previews) and to whether the digital design template is seasonal in nature. To illustrate, if a first user of the digital design template recommendation system 102 has 10 different intents (e.g., intents to determine digital design template recommendations) and a second user of the digital design template recommendation system 102 has 9 of the 10 intents, the digital design template recommendation system 102 utilizes event probability-based recommendations to determine that the $10^{th}$ intent of the first user is also something that the second user is interested in.

Although FIG. 6 illustrates the digital design template recommendation system 102 utilizing user signals 602, in one or more example embodiments, the digital design template recommendation system 102 also utilizes the content of the digital design template. In particular, the digital design template recommendation system 102 recognizes words, phrases, images, and other context within created digital design templates by a user. To illustrate, if a user creates a digital design template, the digital design template recommendation system 102 scans the text of the digital design template and processes the words, phrases, images, and context of the digital design template to determine future digital design recommendations for the user.

Figure 7:
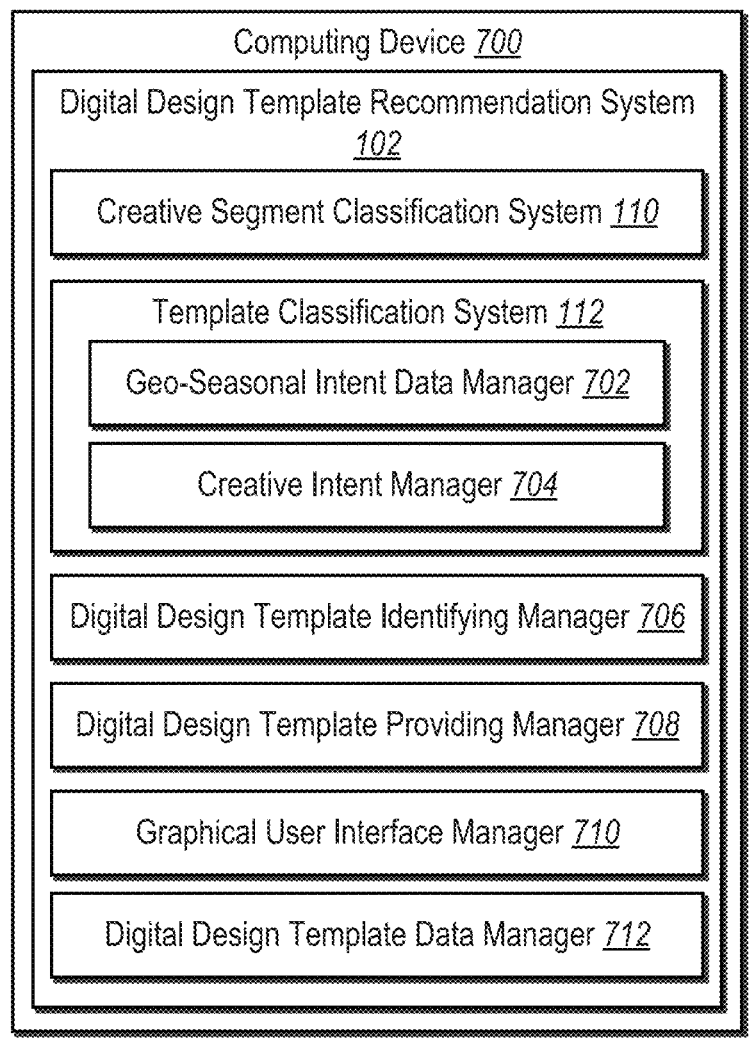
FIG. 7 illustrates an example schematic diagram of the digital design template recommendation system in accordance with one or more embodiments.

Turning to FIG. 7, additional detail will now be provided regarding various components and capabilities of the digital design template recommendation system 102. In particular, FIG. 7 illustrates an example schematic diagram of a computing device 700 (e.g., the server(s) 104 and/or the client device 106) implementing the digital design template recommendation system 102 in accordance with one or more embodiments of the present disclosure. Each of the components 702-712 of the digital design template recommendation system 102 can include software, hardware, or both. For example, the components 702-712 can include one or more instructions stored on a computer-readable storage medium and executable by processors of one or more computing devices, such as a client device or server device. When executed by the one or more processors, the computer-executable instructions of the digital design template recommendation system 102 can cause the computing device(s) to perform the methods described herein. Alternatively, the components 702-712 can include hardware, such as a special-purpose processing device to perform a certain function or group of functions. Alternatively, the components 702-712 of the digital design template recommendation system 102 can include a combination of computer-executable instructions and hardware. As illustrated in FIG. 7, the digital design template recommendation system 102 includes a creative segment classification system 110, a template classification system 112, a geo-seasonal intent data manager 702, a creative intent manager 704, a digital design template identifying manager 706, a digital design template providing manager 708, a graphical user interface manager 710, and a digital design template data manager 712.

The geo-seasonal intent data manager 702 and the creative intent manager 704 act as sub-components of the template classification system 112. The geo-seasonal intent data manager 702 receives, manages, and processes data of users. For example, the geo-seasonal intent data manager 702 receives geographic locales of a user and seasonal significance data. In doing so, the geo-seasonal intent data manager 702 communicates with the digital design template recommendation system 102 regarding geo-seasonal intent data.

The creative intent manager 704 receives, manages, and processes data of digital design templates within the digital design template recommendation system 102. For example, the creative intent manager 704 works in tandem with the geo-seasonal intent data manager 702 to identify creative purposes of a template. Furthermore, the creative intent manager 704 contributes to the digital design template recommendation system 102 generating template classifications discussed above.

The digital design template identifying manager 706 receives data from the digital design template recommendation system 102 and makes selections. For example, the digital design template identifying manager 706 receives geo-seasonal intent data, creative intents, and creative segment classifications to identify relevant digital design templates. Further, in identifying the digital design templates, the digital design template identifying manager 706 prepares the identified digital design templates for presentation to a user.

The digital design template providing manager 706, mentioned above, receives digital design template recommendations from the digital design template identifying manager 706. For example, the digital design template providing manager 706 receives the template recommendations and provides for display the digital design templates to a user within a graphical user interface.

The graphical user interface manager 710 manages the display for a user of the digital design template recommendation system 102. For example, the graphical user interface manager 710 provides a display interface and an interaction interface for a user of the digital design template recommendation system 102.

The digital design template data manager 712 receives and sends information to the digital design template recommendation system 102. For example, the digital design template data manager 712 receives information such as digital design template exports, views, and other interactions. Furthermore, the digital design template data manager 712 forwards on template data to the digital design template recommendation system 102 for improving recommendations.

Furthermore, the components 702-712 of the digital design template recommendation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-712 of the digital design template recommendation system 102 may be implemented as a stand-alone application, such as a desktop or mobile application. Furthermore, the components 702-712 of the digital design template recommendation system 102 may be implemented as one or more web-based applications hosted on a remote server. Alternatively, or additionally, the components 702-712 of the digital design template recommendation system 102 may be implemented in a suite of mobile device applications or "apps." For example, in one or more embodiments, the digital design template recommendation system 102 can comprise or operate in connection with digital software applications such as ADOBE® CREATIVE CLOUD EXPRESS, ADOBE® PHOTOSHOP®, ADOBE® INDESIGN®, or ADOBE® ILLUSTRATOR®. "ADOBE," "PHOTOSHOP," "INDESIGN," and "ILLUSTRATOR" are either registered trademarks or trademarks of Adobe Inc. in the United States and/or other countries.

Figure 8:
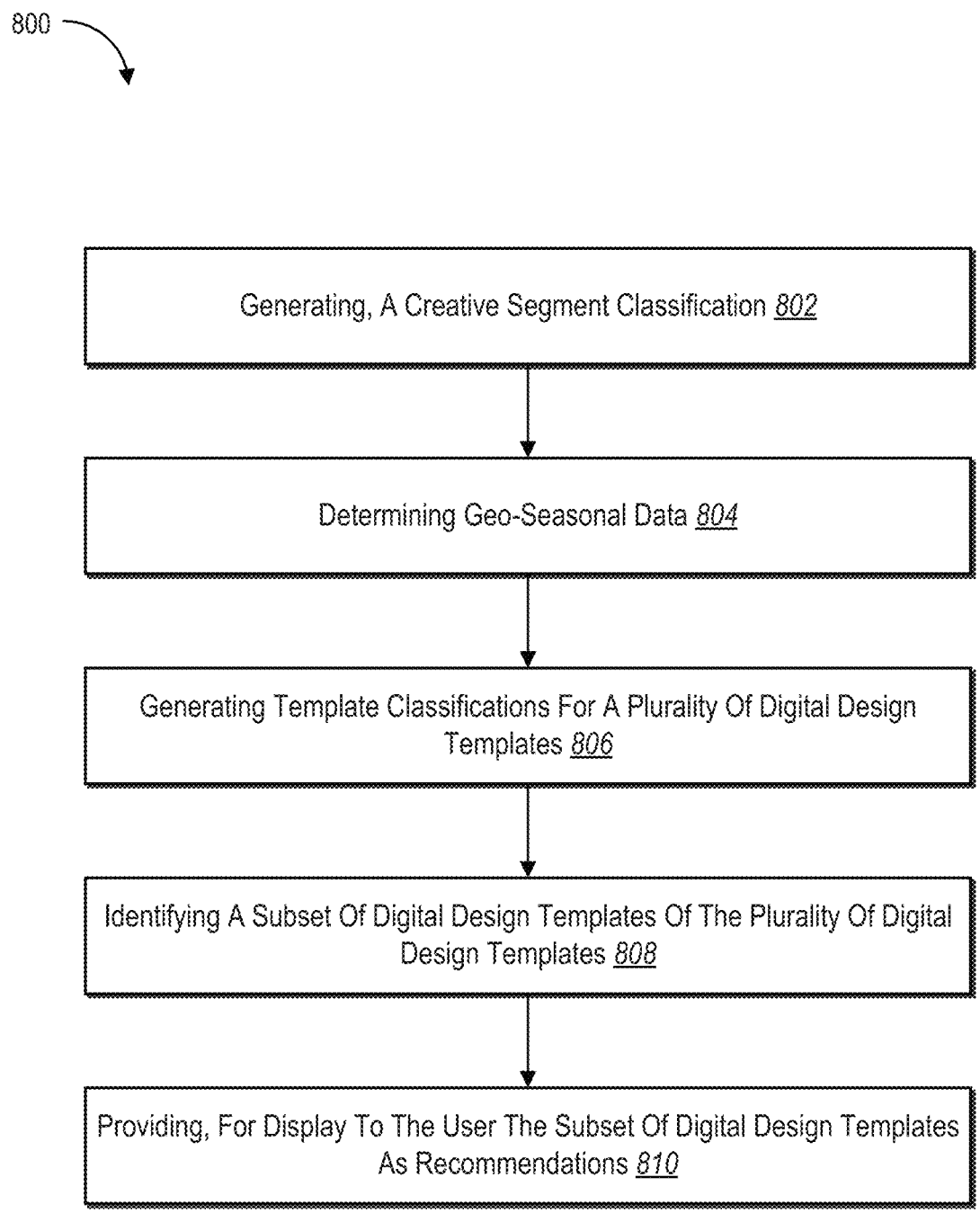
FIG. 8 illustrates a flowchart of a series of acts for identifying and providing to a user digital design templates as recommendations in accordance with one or more embodiments.

FIGS. 1-7, the corresponding text, and the examples provide a number of different methods, systems, devices, and non-transitory computer-readable media of the digital design template recommendation system 102. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for generating and providing one or more digital design template recommendations based on the creative segment classification and the template classifications in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method. Alternatively, a non-transitory computer-readable medium can store instructions thereon that, when executed by at least one processor, cause a computing device to perform the acts of FIG. 8. In some embodiments, a system performs the acts of FIG. 8. For example, in one or more embodiments, a system includes at least one memory device comprising a global recommendation model corresponding to a plurality of users of a suite of software applications and a recommendation personalization model corresponding to personal preferences of a user of the suite of software applications. The system further includes at least one server device configured to cause the system to perform the acts of FIG. 8.

The series of acts 800 includes an act 802 for generating, a creative segment classification. For example, the act 802 includes generating, for a user a creative segment classification. For instance, in one or more embodiments, the act 802 involves providing, via the graphical user interface, a creative segment classification survey. Furthermore, the act 802 includes wherein generating the creative segment classification further comprises assigning the creative segmentation classification to the user based on a user response to the creative segment classification survey.

In one or more embodiments, the act 802 also includes determining prior user interactions with digital design templates that includes at least one of prior user digital design template previews, prior user clicks, or prior user exports, and determining the creative segment classification, utilizing a classification neural network, based on the prior user interactions. In particular, the act 802 also includes sending to the user a creative segment classification survey, receiving a response to the creative segment classification survey from the user and determining a creative segment classification of the user. In one or more instances, the act 802 includes detecting a null user response to the creative segment classification survey and determining a user classifier based on at least one of prior user interactions with digital design templates, analytics history, or skill level of the user.

Additionally, the series of acts 800 includes an act 804 of determining geo-seasonal data. The act 804 includes, determining geo-seasonal intent data. In one or more example embodiments, the act 804 includes wherein determining geo-seasonal intent data further comprises determining unique exports for each digital design template of the plurality of digital design templates in each geographic locale for given time periods. Furthermore, the act 804 includes segmenting, utilizing a seasonal significance model, seasonal digital design templates from non-seasonal digital design templates by: generating a length vector that spans a year for each digital design template that comprises export counts per geographic locale, normalizing each array of the length vector that spans a year utilizing a min-max scaler, and determining that the digital design template is seasonal when an absolute value from utilizing the min-max scaler is less than or equal to a predetermined threshold.

In one or more example embodiments, the act 804 includes wherein determining geo-seasonal intent data further comprises determining, based on a geographic locale of the user, unique exports for each digital design template of the plurality of digital design templates in each geographic locale for given time periods. Furthermore, the act 804 also includes wherein determining geo-seasonal intent data further comprises utilizing a seasonal significance model to separate seasonal digital design templates from non-seasonal digital design templates by: generating a length vector that spans a year for each digital design template that comprises export counts per geographic locale, normalizing each array of the length vector utilizing a min-max scaler, and determining that the digital design template is seasonal when an absolute value from utilizing the min-max scaler is less than or equal to a predetermined threshold.

The series of acts 800 also includes an act 806 of generating template classifications for a plurality of digital design templates. The act 806 includes generating template classifications, utilizing a machine learning model, for a plurality of digital design templates based on geo-seasonality and creative intent. To illustrate, the act 806 includes determining a set of curated collections per creative segment classification, determining a user response to a creative segment classification survey, determining whether the user made any prior exports of digital design templates and extracting a creative intent for the template classifications. Moreover, the act 806 also includes training the machine learning model with at least one of a set of curated collections per creative segment classification, a user response to a creative segment classification survey, or prior exports of digital design templates and extracting a creative intent for the template classifications based on the trained machine learning model.

Further, the series of acts 800 includes an act 808 of identifying a subset of digital design templates of the plurality of digital design templates. The act 808 includes identifying a subset of digital design templates of the plurality of digital design templates based on the template classifications and the geo-seasonal intent data and the creative segment classification of the user.

Additionally, the series of acts 800 includes an act 810 of providing the subset of digital design templates as recommendations. The act 810 includes providing, for display to the user within a graphical user interface, the subset of digital design templates as recommendations.

In one or more embodiments, the digital design template recommendation system 102, for the series of acts 800 performs the acts of detecting a new digital design template, identifying a subset of digital design templates of a plurality of seasonal digital design templates per geographic locale for given time periods, determining for each template of the subset of digital design templates, the creative intent based on curated phrases by users for each template, ranking, utilizing a creative intent ranker, each digital design template of the subset of digital design templates based on each template's creative intent and determining a ranking for the new digital design template based on overlapping creative intent of the new digital design template with each digital design template of the subset of digital design templates.

In other instances, the series of acts 800 further comprises detecting a new digital design template not included within the plurality of digital design templates, identifying a subset of digital design templates from a plurality of seasonal digital design templates per geographic locale for given time periods, determining for each template of the subset of digital design templates the creative intent based on phrases used by users to add descriptive context to each template, ranking, utilizing a creative intent ranker, each template of the subset of digital design templates based on each template's creative intent and determining a ranking for the detected new digital design template not included within the plurality of digital design templates based on a frequency of overlapping creative intents of the subset of digital design templates.

In one or more embodiments, the digital design template recommendation system 102, for the series of acts 800 performs the acts of generating, by utilizing a personalization machine learning model, a personalized digital design template recommendation for the user based on the creative segment classification, geo-seasonal intent data, historical analytics, and real-time data of the user. In other embodiments, the series of acts further performs the acts of generating, by utilizing a personalization machine learning model, a personalized digital design template recommendation for the user based on the creative segment classification, geo-seasonal intent data, historical analytics, real-time data of the user, and user signal data.

In one or more embodiments, the digital design template recommendation system 102, for the series of acts 800 performs the acts of aggregating the creative segment classification, geo-seasonal intent data, historical analytics, and real-time data of the user, generating, by utilizing a personalization machine learning model, a personalized digital design template recommendation for the user based on the aggregation, and providing for display to the user, within a graphical user interface, the personalized digital design template recommendation.

In one or more embodiments, the digital design template recommendation system 102, for the series of acts 800 performs the acts of determining, prior user exports of digital design templates and prior user views of digital design templates, based on the determination, utilize an exponential decay function giving more weight to recent user actions and whether the digital design template is a seasonal digital design template and generating, an event probability-based recommendation for the user.

In one or more embodiments, the digital design template recommendation system 102, for the series of acts 800 performs the acts of detect a new digital design template identifying a subset of digital design templates from a plurality of seasonal digital design templates per geographic locale for given time periods, determining for each template of the subset of digital design templates the creative intent based on user curated phrases to add descriptive context to each template, ranking, utilizing a creative intent ranker, each template of the subset of digital design templates based on each template's creative intent and determining a ranking for the detected new digital design template not included within the plurality of digital design templates based on a frequency of overlapping creative intents of the subset of digital design templates.

Moreover, the series of acts 800 also includes generate, utilizing a machine learning model, a user a creative segment classification based on prior user clicks, prior user digital design previews, and prior user exports, determining geo-seasonal intent data based on a geographic location of the user and time of user access, generating template classifications, utilizing a machine learning model, for a plurality of digital design templates based on geo-seasonality and creative intent associated with each of the plurality of digital design templates, identifying a subset of digital design templates of the plurality of digital design templates based on the template classifications and the geo-seasonal intent data and the creative segment classification of the user and providing, for display to the user within a graphical user interface, the subset of digital design templates as recommendations.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
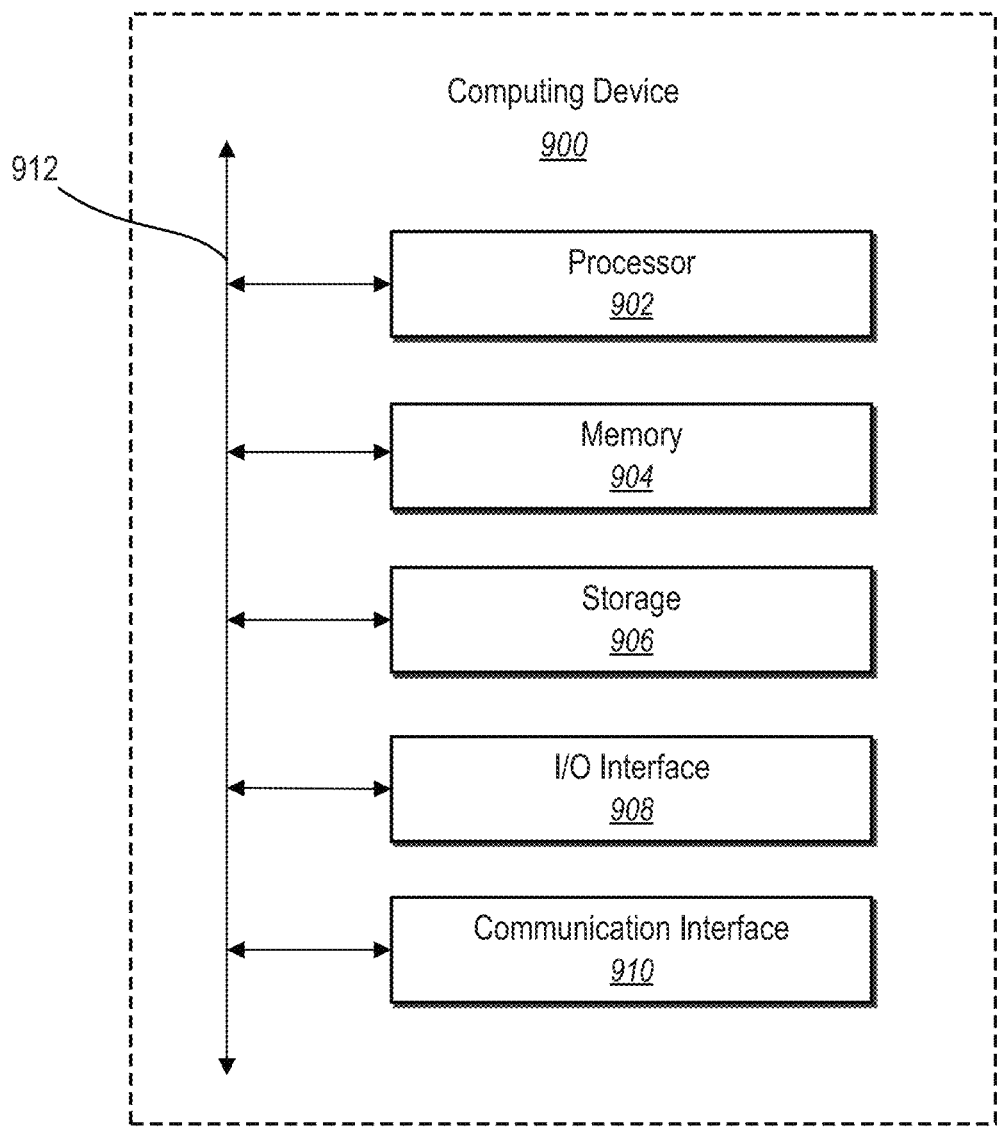
FIG. 9 illustrates a block diagram of an exemplary computing device in accordance with one or more embodiments.

FIG. 9 illustrates a block diagram of an example computing device 900 configured to perform one or more of the processes described above. One will appreciate that one or more computing devices, such as the computing device 900, represent the computing devices described above (e.g., the server(s) 104 and/or the client device 106). In one or more embodiments, the computing device 900 is a mobile device (e.g., a mobile telephone, a smartphone, a PDA, a tablet, a laptop, a camera, a tracker, a watch, a wearable device). In some embodiments, the computing device 900 is a non-mobile device (e.g., a desktop computer or another type of client device). Further, the computing device 900 is a server device that includes cloud-based processing and storage capabilities in one or more implementations.

As shown in FIG. 9, the computing device 900 includes one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, for a user a creative segment classification;
   determining geo-seasonal intent data for a plurality of digital design templates by segmenting seasonal digital design templates from non-seasonal digital design templates by:
   generating a plurality of length vectors for the plurality of digital design templates that comprises export counts per geographic locale; and
   identifying a seasonal digital design template based on determining a value from a length vector of the plurality of length vectors satisfies a predetermined threshold;
   generating template classifications for theft plurality of digital design templates by utilizing a machine learning model to process the geo-seasonal intent data and creative intent;
   identifying a subset of digital design templates of the plurality of digital design templates based on the template classifications, the geo-seasonal intent data and the creative segment classification of the user; and
   providing, for display to the user within a graphical user interface, the subset of digital design templates as recommendations.

2. The computer-implemented method of claim 1, further comprising providing, via the graphical user interface, a creative segment classification survey;
   wherein generating the creative segment classification further comprises assigning the creative segment classification to the user based on a user response to the creative segment classification survey.

3. The computer-implemented method of claim 2, further comprising:
   determining prior user interactions with digital design templates that includes at least one of prior user digital design template previews, prior user clicks, or prior user exports; and
   determining the creative segment classification, utilizing a classification neural network, based on the prior user interactions.

4. The computer-implemented method of claim 1, wherein determining the geo-seasonal intent data further comprises determining unique exports for the plurality of digital design templates in each geographic locale for a predetermined time period.

5. The computer-implemented method of claim 4, wherein:
   generating the plurality of length vectors comprises generating the plurality of length vectors for the export counts per geographic locale that spans a year;
   the computer-implemented method further comprises normalizing a plurality of arrays of the plurality of length vectors that spans the year utilizing a min-max scaler; and
   identifying the seasonal digital design template comprises determining an absolute value of an array of the length vector from the plurality of length vectors is less than or equal to the predetermined threshold.

6. The computer-implemented method of claim 1, wherein generating template classifications utilizing the machine learning model further comprises:
- determining a set of curated collections per creative segment classification;
- determining a user response to a creative segment classification survey;
- determining whether the user made any prior exports of digital design templates; and
- extracting a creative intent for the template classifications.

7. The computer-implemented method of claim 1, further comprising:
- detecting a new digital design template;
- identifying a subset of digital design templates of a plurality of seasonal digital design templates per geographic locale for given time periods;
- determining for each template of the subset of digital design templates, the creative intent based on curated phrases by users for each template;
- ranking, utilizing a creative intent ranker, each digital design template of the subset of digital design templates based on each template's creative intent; and
- determining a ranking for the new digital design template based on overlapping creative intent of the new digital design template with each digital design template of the subset of digital design templates.

8. The computer-implemented method of claim 1, further comprising:
- generating, by utilizing a personalization machine learning model, a personalized digital design template recommendation for the user based on the creative segment classification, geo-seasonal intent data, historical analytics, and real-time data of the user.

9. A non-transitory computer-readable medium comprising instructions that, when executed by at least one processor, cause the at least one processor to perform operations comprising:
- generating, for a user a creative segment classification;
- determining geo-seasonal intent data for a plurality of digital design templates by segmenting seasonal digital design templates from non-seasonal digital design templates by:
  - generating a plurality of length vectors for the plurality of digital design templates that comprises export counts per geographic locale; and
  - identifying a seasonal digital design template based on determining a value from a length vector of the plurality of length vectors satisfies a predetermined threshold;
- generating template classifications for theft plurality of digital design templates by utilizing a machine learning model to process the geo-seasonal intent data and creative intent;
- identifying a subset of digital design templates of the plurality of digital design templates based on the template classifications, the geo-seasonal intent data and the creative segment classification of the user; and
- providing, for display to the user within a graphical user interface, the subset of digital design templates as recommendations.

10. The non-transitory computer-readable medium of claim 9, wherein generating the creative segment classification further comprises:
- sending to the user a creative segment classification survey;
- receiving a response to the creative segment classification survey from the user; and
- determining a creative segment classification of the user.

11. The non-transitory computer-readable medium of claim 10, wherein detecting a user response to a creative segment classification survey further comprises:
- detecting a null user response to the creative segment classification survey; and
- determining a user classifier based on at least one of prior user interactions with digital design templates, analytics history, or skill level of the user.

12. The non-transitory computer-readable medium of claim 9, wherein determining geo-seasonal intent data further comprises determining, based on a geographic locale of the user, unique exports for each digital design template of the plurality of digital design templates in each geographic locale for given time periods.

13. The non-transitory computer-readable medium of claim 12, wherein:
- generating the plurality of length vectors comprises generating the plurality of length vectors that comprises export counts per geographic locale that spans a year;
- the operations further comprise normalizing a plurality of arrays of the plurality of length vectors that spans the year utilizing a min-max scaler; and
- identifying the seasonal digital design template comprises determining an absolute value of an array of the length vector from the plurality of length vectors is less than or equal to the predetermined threshold.

14. The non-transitory computer-readable medium of claim 9, wherein generating template classifications utilizing the machine learning model further comprises:
- training the machine learning model with at least one of a set of curated collections per creative segment classification, a user response to a creative segment classification survey, or prior exports of digital design templates; and
- extracting a creative intent for the template classifications based on the machine learning model.

15. The non-transitory computer-readable medium of claim 9, further comprising:
- generating, by utilizing a personalization machine learning model, a personalized digital design template recommendation for the user based on the creative segment classification, geo-seasonal intent data, historical analytics, real-time data of the user, and user signal data.

16. The non-transitory computer-readable medium of claim 9, further comprising:
- detecting a new digital design template;
- identifying a subset of digital design templates from a plurality of seasonal digital design templates per geographic locale for given time periods;
- determining for each template of the subset of digital design templates the creative intent based on phrases used by users to add descriptive context to each template;
- ranking, utilizing a creative intent ranker, each template of the subset of digital design templates based on each template's creative intent; and
- determining a ranking for the new digital design template based on a frequency of overlapping creative intents of the subset of digital design templates.

17. A system comprising:
at least one memory device; and
at least one processor configured to cause the system to:
generate, utilizing a machine learning model, a user a creative segment classification based on prior user clicks, prior user digital design previews, and prior user exports;
determine geo-seasonal intent data for a plurality of digital design templates by segmenting seasonal digital design templates from non-seasonal digital design templates by:
generating a plurality of length vectors for the plurality of digital design templates that comprises export counts per geographic locale; and
identifying a seasonal digital design template based on determining a value from a length vector of the plurality of length vectors satisfies a predetermined threshold;
generate template classifications for the plurality of digital design templates by utilizing a machine learning model to process the geo-seasonal intent data and creative intent;
identify a subset of digital design templates of the plurality of digital design templates based on the template classifications and the geo-seasonal intent data and the creative segment classification of the user; and
provide, for display to the user within a graphical user interface, the subset of digital design templates as recommendations.

18. The system of claim 17, wherein the at least one processor is further configured to cause the system to:
aggregate the creative segment classification, geo-seasonal intent data, historical analytics, and real-time data of the user;
generate, by utilizing a personalization machine learning model, a personalized digital design template recommendation for the user based on the aggregation; and
provide for display to the user, within a graphical user interface, the personalized digital design template recommendation.

19. The system of claim 17, wherein the at least one processor is further configured to cause the system to:
determine, prior user exports of the plurality of digital design templates and prior user views of the plurality of digital design templates;
based on the determination, utilize an exponential decay function giving more weight to recent user actions and whether a digital design template is a seasonal digital design template; and
generating, an event probability-based recommendation for the user.

20. The system of claim 17, wherein the at least one processor is further configured to cause the system to:
detect a new digital design template;
identify a subset of digital design templates from a plurality of seasonal digital design templates per geographic locale for given time periods;
determine for each template of the subset of digital design templates the creative intent based on user curated phrases to add descriptive context to each template;
rank, utilizing a creative intent ranker, each template of the subset of digital design templates based on each template's creative intent; and
determine a ranking for the new digital design template based on a frequency of overlapping creative intents of the subset of digital design templates.

\* \* \* \* \*